(12) United States Patent
Murata et al.

(10) Patent No.: US 11,914,236 B2
(45) Date of Patent: Feb. 27, 2024

(54) LIQUID CRYSTAL DISPLAY DEVICE

(71) Applicant: Sharp Display Technology Corporation, Kameyama (JP)

(72) Inventors: Koji Murata, Kameyama (JP); Hiroshi Tsuchiya, Kameyama (JP); Shinpei Higashida, Kameyama (JP); Takahiro Sasaki, Kameyama (JP); Takashi Satoh, Kameyama (JP); Shinji Shimada, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/092,858

(22) Filed: Jan. 3, 2023

(65) Prior Publication Data

US 2023/0213798 A1 Jul. 6, 2023

(30) Foreign Application Priority Data

Jan. 5, 2022 (JP) .................................. 2022-000450

(51) Int. Cl.
| | |
|---|---|
| *G02F 1/13* | (2006.01) |
| *G02F 1/1335* | (2006.01) |
| *G02F 1/1343* | (2006.01) |
| *G02F 1/133* | (2006.01) |
| *G02F 1/13357* | (2006.01) |

(52) U.S. Cl.
CPC ........ *G02F 1/1323* (2013.01); *G02F 1/13306* (2013.01); *G02F 1/133512* (2013.01); *G02F 1/133514* (2013.01); *G02F 1/134309* (2013.01); *G02F 1/336* (2013.01)

(58) Field of Classification Search
None
See application file for complete search history.

(56) References Cited

U.S. PATENT DOCUMENTS

| | | | |
|---|---|---|---|
| 2002/0018341 A1 | 2/2002 | Torihara et al. | |
| 2009/0135342 A1* | 5/2009 | Lee .................. | G02F 1/134363 349/96 |
| 2013/0010237 A1* | 1/2013 | Fujiyama .......... | G02F 1/134309 349/103 |
| 2017/0059898 A1 | 3/2017 | Su et al. | |

(Continued)

FOREIGN PATENT DOCUMENTS

| | | |
|---|---|---|
| JP | 2002-124112 A | 4/2002 |
| JP | 2021-067852 A | 4/2021 |

*Primary Examiner* — Shan Liu
(74) *Attorney, Agent, or Firm* — ScienBiziP, P.C.

(57) ABSTRACT

The liquid crystal display device of the present invention includes an active matrix substrate including a first electrode, a first insulating layer, and second electrodes including a first linear electrode; a color filter substrate including a black matrix, a color filter layer, a third electrode including second linear electrodes, and a fourth electrode which is a floating electrode. The third electrode and the fourth electrode are disposed between the black matrix and the liquid crystal layer. The second linear electrodes extend in a second direction and each overlap a portion of the black matrix extending in the second direction. The fourth electrode is disposed between the second linear electrodes and overlaps the black matrix in a plan view. The control circuit switches between application of driving voltage and application of constant voltage to the third electrode.

11 Claims, 27 Drawing Sheets

(56) References Cited

U.S. PATENT DOCUMENTS

| | | | |
|---|---|---|---|
| 2017/0192263 A1* | 7/2017 | Jiang | G02F 1/1323 |
| 2017/0262131 A1* | 9/2017 | Maruyama | G06F 3/0445 |
| 2020/0249504 A1* | 8/2020 | Hopkin | G09G 3/3426 |
| 2021/0124223 A1 | 4/2021 | Murata et al. | |
| 2021/0149511 A1* | 5/2021 | Chung | G06F 3/0416 |
| 2021/0405404 A1* | 12/2021 | Chang | G09G 5/10 |

* cited by examiner

FIG.21

LIQUID CRYSTAL DISPLAY DEVICE

CROSS-REFERENCE TO RELATED APPLICATIONS

The present application claims priority under 35 U.S.C. § 119 to Japanese Patent Application No. 2022-000450 filed on Jan. 5, 2022, the contents of which are incorporated herein by reference in their entirety.

BACKGROUND OF THE INVENTION

Field of the Invention

The present disclosure relates to liquid crystal display devices.

Description of Related Art

Liquid crystal display devices are display devices utilizing a liquid crystal composition to display images. In a typical display mode thereof, voltage is applied to a liquid crystal composition sealed between paired substrates such that the alignment of liquid crystal molecules in the liquid crystal composition is changed according to the applied voltage, whereby the amount of light passing through the device is controlled. Such liquid crystal display devices have advantageous features such as thin profile, light weight, and low power consumption, and are therefore used in a variety of fields.

Studies to enhance the viewing angle characteristics of liquid crystal display devices have been made such that the same image can be observed regardless of whether the angle of observation is in a narrow viewing angle range or a wide viewing angle range. Meanwhile, a display method considered in terms of privacy protection is one that allows observation of an image in a narrow viewing angle range but makes the image difficult to observe in a wide viewing angle range outside the narrow viewing angle range. For example, JP 2021-67852 A discloses a liquid crystal display device capable of switching between the narrow viewing angle mode and the wide viewing angle mode by controlling the voltage applied to the third electrode in the color filter substrate.

US 2017/0059898 A1 discloses a liquid crystal display device including a first substrate provided with a first electrode and a first alignment film thereon; a liquid crystal layer; and a second substrate provided with a second electrode, a third electrode, and a second alignment film thereon, wherein the viewing angle is switchable by applying voltage to the first electrode.

BRIEF SUMMARY OF THE INVENTION

The present inventors found in their studies that applying voltage to an electrode in a color filter substrate with a black matrix sometimes caused light leakage in the privacy mode (narrow viewing angle mode) and a decrease in front contrast ratio. As a result of examining the cause of the light leakage, the inventors found that applying voltage to an electrode in a color filter substrate sometimes charges the black matrix and forms an undesirable electric field in the liquid crystal layer, which may cause light leakage and a decrease in front contrast ratio in the privacy mode.

The liquid crystal display device disclosed in US 2017/0059898 A1 includes a planar solid electrode as the first electrode of the counter substrate. With this configuration, applying voltage to the first electrode always generates a vertical electric field in the entire liquid crystal panel. A high front contrast ratio is thus difficult to achieve with this device.

In response to the above issues, an object of the present invention is to provide a liquid crystal display device capable of switching between the privacy mode and the public mode and achieving a high contrast ratio during display in the privacy mode.

(1) One embodiment of the present invention is directed to a liquid crystal display device including: a liquid crystal panel provided with sub-pixels arranged in a matrix pattern; and a control circuit, the liquid crystal panel sequentially including an active matrix substrate, a liquid crystal layer, and a color filter substrate, the active matrix substrate sequentially including a first substrate, a first electrode, a first insulating layer, and second electrodes arranged in the respective sub-pixels and including a first linear electrode extending in a first direction, the color filter substrate including a second substrate, a black matrix lying between the sub-pixels, a color filter layer, a third electrode including second linear electrodes, and a fourth electrode which is a floating electrode, the third electrode and the fourth electrode disposed between the black matrix and the liquid crystal layer, the second linear electrodes extending in a second direction that intersects the first direction and each overlapping a portion of the black matrix extending in the second direction, the fourth electrode disposed between the second linear electrodes and overlapping at least a portion of the black matrix in a plan view, the control circuit configured to switch between application of driving voltage and application of constant voltage to the third electrode.

(2) In an embodiment of the present invention, the liquid crystal display device includes the structure (1), and the fourth electrode is disposed in the same layer as the third electrode.

(3) In an embodiment of the present invention, the liquid crystal display device includes the structure (1) or (2), the third electrode further includes a third linear electrode between the second linear electrodes, and the third linear electrode extends in the second direction and overlaps an optical opening in one of the sub-pixels in a plan view.

(4) In an embodiment of the present invention, the liquid crystal display device includes the structure (3), the fourth electrode includes a fourth linear electrode extending in the second direction and overlapping the optical opening in the sub-pixel, and the fourth linear electrode is disposed between one of the second linear electrodes and the third linear electrode.

(5) In an embodiment of the present invention, the liquid crystal display device includes the structure (3), the fourth electrode includes island electrodes independent of one another in a plan view, and the island electrodes each are disposed between one of the second linear electrodes and the third linear electrode.

(6) In an embodiment of the present invention, the liquid crystal display device includes any of the structures (1) to (5), and the liquid crystal display device includes a dielectric layer between the third electrode and the liquid crystal layer.

(7) In an embodiment of the present invention, the liquid crystal display device includes any of the structures (1) to (6), and the third electrode is formed from a transparent conductive material.

(8) In an embodiment of the present invention, the liquid crystal display device includes any of the structures (1) to (7), the active matrix substrate includes a gate line and a source line intersecting the gate line, and the gate line extends in the second direction.

(9) In an embodiment of the present invention, the liquid crystal display device includes the structure (8), and at least part of each of the second linear electrodes overlaps the gate line in a plan view.

(10) In an embodiment of the present invention, the liquid crystal display device includes any of the structures (1) to (9), the control circuit is capable of switching between a first display mode and a second display mode, the first display mode allowing a first image to be observed in a narrow viewing angle range including a direction normal to the liquid crystal panel, the second display mode allowing the first image to be observed in a wide viewing angle range including the narrow viewing angle range, and the control circuit is configured to apply the driving voltage to the third electrode in the first display mode and apply the constant voltage to the third electrode in the second display mode.

(11) In an embodiment of the present invention, the liquid crystal display device includes the structure (10), the liquid crystal display device includes a backlight behind a back surface of the liquid crystal panel, the backlight includes a light source and a shading louver disposed closer to the liquid crystal panel than the light source is, and the control circuit is configured to control the luminance of the backlight to be lower in the first display mode than in the second display mode.

The present invention can provide a liquid crystal display device that can switch between the privacy mode and the public mode and achieve a high contrast ratio even during display in the privacy mode.

BRIEF DESCRIPTION OF THE DRAWINGS

FIG. 21 is a table summarizing the simulation results of the contrast ratios in Examples 1 to 3 and Comparative Example 1.

DETAILED DESCRIPTION OF THE INVENTION

Hereinafter, embodiments of the present invention are described. The present invention is not limited to the following embodiments, and the design of the present invention can be modified as appropriate within the range satisfying the configuration of the present invention. Hereinafter, the same reference signs refer to the same portions or the portions having the same function throughout the drawings, and redundant description of already described portions is omitted as appropriate. The modes in the present invention may appropriately be combined within the gist of the present invention.

Embodiment 1

A liquid crystal display device of Embodiment 1 includes a liquid crystal panel provided with sub-pixels arranged in a matrix pattern; and a control circuit, the liquid crystal panel sequentially including an active matrix substrate, a liquid crystal layer, and a color filter substrate, the active matrix substrate sequentially including a first substrate, a first electrode, a first insulating layer, and second electrodes arranged in the respective sub-pixels and including a first linear electrode extending in a first direction, the color filter substrate including a second substrate, a black matrix lying between the sub-pixels, a color filter layer, a third electrode including second linear electrodes, and a fourth electrode which is a floating electrode, the third electrode and the fourth electrode disposed between the black matrix and the liquid crystal layer, the second linear electrodes extending in a second direction that intersects the first direction and each overlapping a portion of the black matrix extending in the second direction, the fourth electrode disposed between the second linear electrodes and overlapping at least a portion of the black matrix in a plan view, the control circuit configured to switch between application of driving voltage and application of constant voltage to the third electrode.

Figure 1:
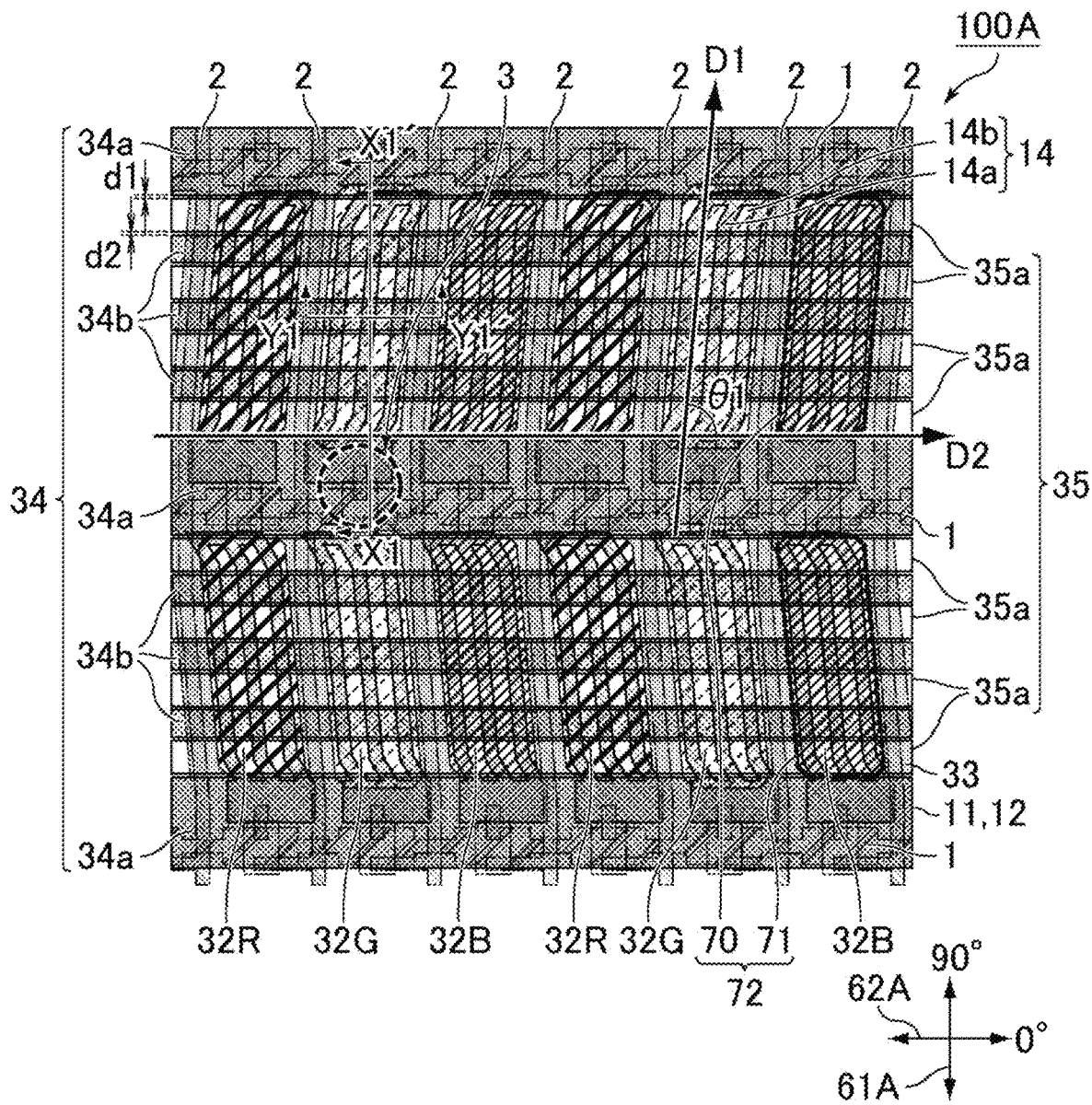
FIG. 1 is a schematic plan view showing an example of a liquid crystal display device of Embodiment 1.
Figure 2:
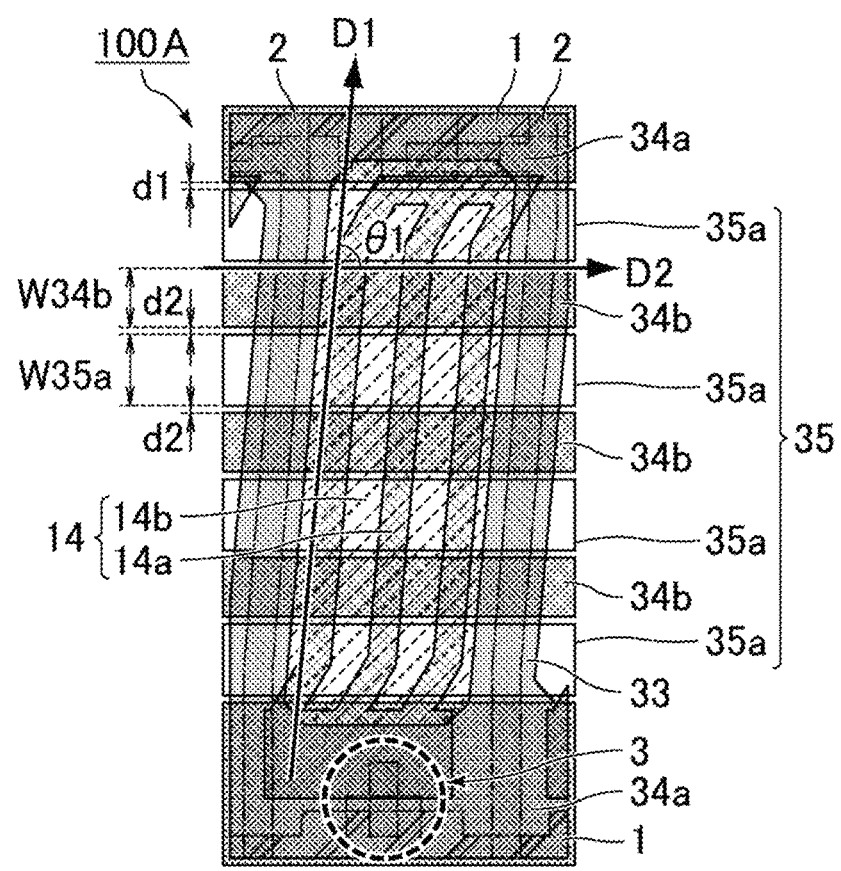
FIG. 2 is a schematic plan view of a sub-pixel in the liquid crystal display device in FIG. 1.
Figure 3:
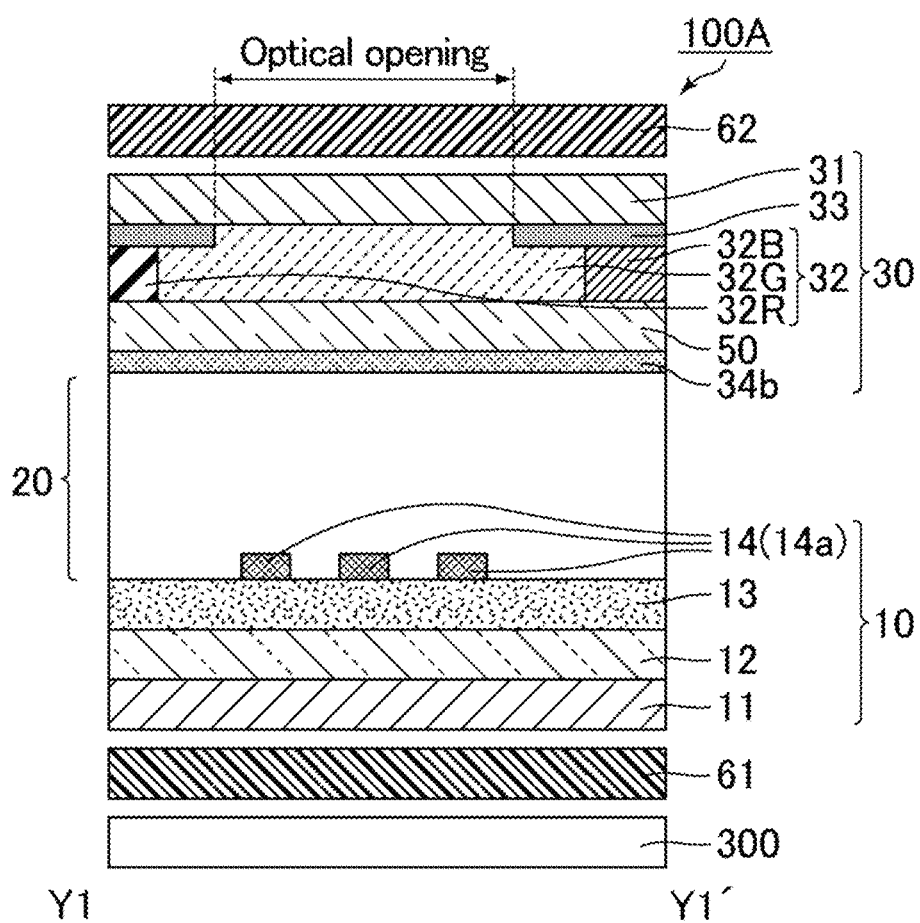
FIG. 3 is a schematic cross-sectional view taken along line Y1-Y1' in FIG. 1.
Figure 4:
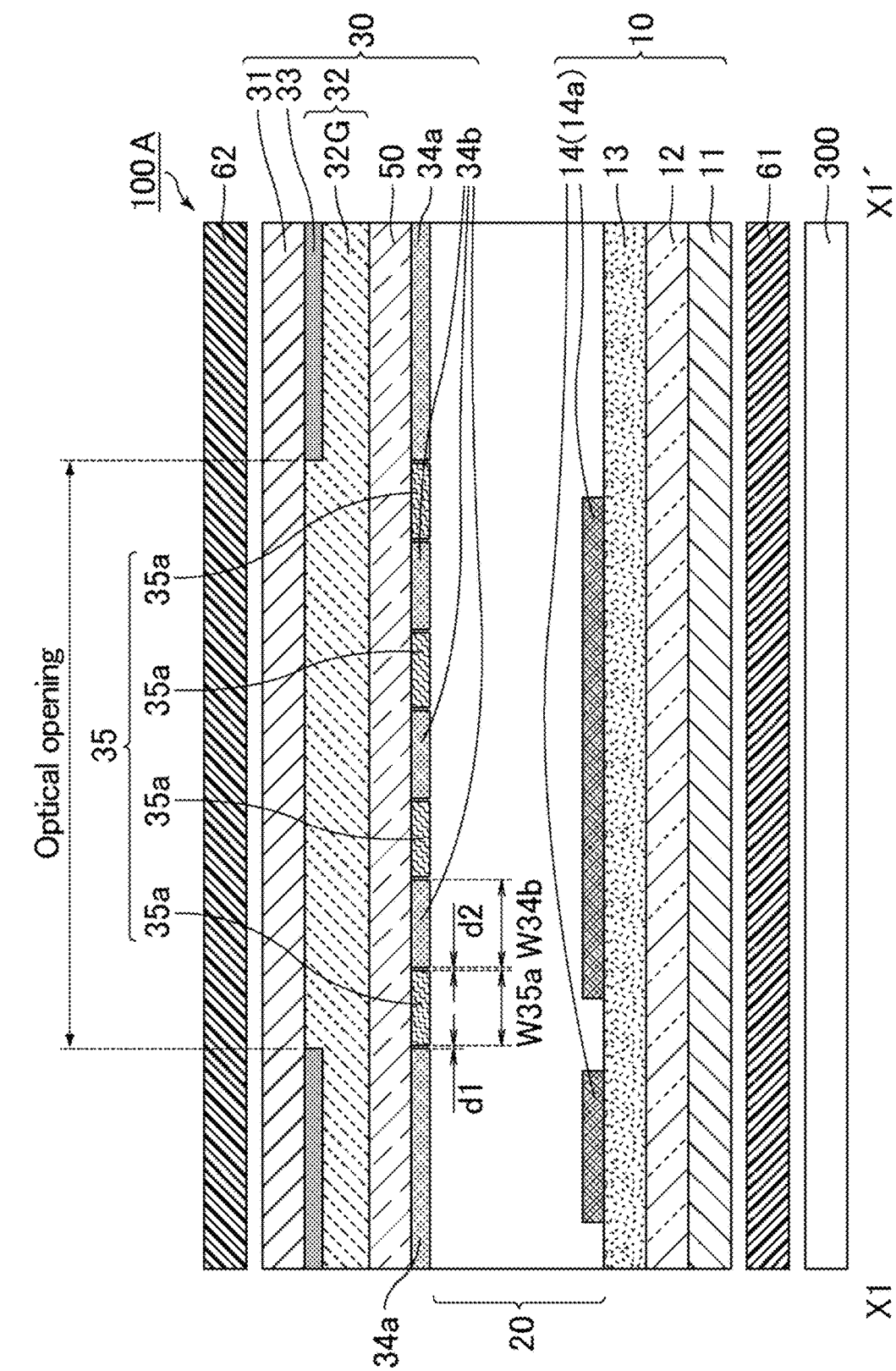
FIG. 4 is a schematic cross-sectional view taken along line X1-X1' in FIG. 1.

The liquid crystal display device of Embodiment 1 is described with reference to the drawings. FIG. 1 is a schematic plan view showing an example of a liquid crystal display device of Embodiment 1. FIG. 2 is a schematic plan view of a sub-pixel in the liquid crystal display device in FIG. 1. FIG. 3 is a schematic cross-sectional view taken along line Y1-Y1' in FIG. 1. FIG. 4 is a schematic cross-sectional view taken along line X1-X1' in FIG. 1.

(Liquid Crystal Panel)

As shown in FIG. 1, the liquid crystal display device of Embodiment 1 includes a liquid crystal panel 100A in which sub-pixels are arranged in a matrix pattern. The active matrix substrate may include gate lines 1 and source lines 2 that intersect the gate lines 1. The "sub-pixel" as used herein refers to a region surrounded by two adjacent gate lines 1 and two adjacent source lines 2 as shown in FIG. 1 and FIG. 2. The later-described first sub-pixels 70 and second sub-pixels 71 are simply referred to as sub-pixels when no distinction is made between them. Thin film transistors (TFTs) 3 as switching elements may be arranged at the respective intersections between the gate lines 1 and the source lines 2.

Preferably, the sub-pixels each are provided with an optical opening that allows light to pass through the liquid crystal panel 100A. The optical openings correspond to the regions each surrounded by the dotted line inside a sub-pixel in FIG. 1. The optical openings in a transmissive or transflective liquid crystal panel 100A allow light from the back surface of the liquid crystal panel 100A to pass therethrough toward the front of the liquid crystal panel 100A. The optical openings in a reflective or transflective liquid crystal panel 100A allow light to pass therethrough, the light including incident light entering the liquid crystal panel 100A from the outside of the panel and reflection light emitted toward the outside of the liquid crystal panel 100A as a result of reflection of the incident light inside the liquid crystal panel 100A. The optical openings in a plan view may overlap, for example, a transparent component such as a polarizing plate or a color filter. The liquid crystal panel 100A in Embodiment 1 is a transmissive one.

As shown in FIG. 3 and FIG. 4, the liquid crystal panel 100A sequentially includes an active matrix substrate 10, a liquid crystal layer 20, and a color filter substrate 30. Herein, the side closer to the screen (display screen) of the liquid crystal display device is also referred to as the "viewer side (front surface side)", and the side farther from the screen (display screen) of the liquid crystal display device is also referred to as the "back surface side". The view from the direction normal to the front surface is also referred to as a "plan view".

The active matrix substrate 10 sequentially includes a first substrate 11, a first electrode 12, a first insulating layer 13, and second electrodes 14. The first electrode 12 and the second electrodes 14 are stacked with the first insulating layer 13 in between and constitute a fringe field switching (FFS) electrode structure. The first insulating layer 13 may be formed from, for example, an inorganic material such as silicon oxide or silicon nitride.

The first electrode 12 in Embodiment 1 is preferably a solid electrode. The solid electrode is a planar electrode without any slit or opening at least in a region coinciding with the optical opening of a sub-pixel in a plan view. One first electrode 12 may be disposed in each sub-pixel, may be disposed common to some sub-pixels, or may be formed over the entire display region regardless of the boundaries of the sub-pixels. The first electrode 12 may be formed from, for example, a transparent conductive material such as indium tin oxide (ITO) or indium zinc oxide (IZO).

One second electrode 14 is disposed in each of the sub-pixels. As shown in FIG. 1 and FIG. 2, each second electrode 14 includes a first linear electrode 14a extending in the first direction D1. At least part of the first linear electrode 14a only needs to extend in the first direction D1, and the rest of the first linear electrode 14a may extend in a direction different from the first direction D1. There may be a plurality of the first linear electrodes 14a. The ends of adjacent first linear electrodes 14a may be connected by an electrode material, so that an opening surrounded by the electrode material is formed. Each second electrode 14 may be a comb-teeth electrode in which the ends of its adjacent first linear electrodes 14a are open, and a slit may be formed between adjacent first linear electrodes 14a. FIG. 1 and FIG. 2 show a case where the ends of the first linear electrodes 14a are connected by an electrode material, so that the openings 14b are formed.

The width of the first linear electrode 14a may be, for example, 2 to 5 µm. The width of each slit or opening may be, for example, 2 to 5 µm. The width of the first linear electrode 14a and the width of each slit or opening each are the width in a direction perpendicular to the first direction D1.

The second electrodes 14 are formed from, for example, a transparent conductive material such as ITO or IZO. The second electrodes 14 each are electrically connected to the corresponding source line 2 through a semiconductor layer in the corresponding TFT 3, for example.

Either the first electrode 12 or the second electrodes 14 are preferably arranged with electrical connection over the sub-pixels. The expression "over the sub-pixels" means that the electrode overlaps the sub-pixels by crossing the boundaries of the sub-pixels. With either the first electrode 12 or the second electrodes 14 electrically connected over the sub-pixels, common constant voltage can be applied to the first electrode 12 or the second electrodes 14 in the sub-pixels.

The first substrate 11 and the later-described second substrate 31 are not limited, and may each be, for example, a substrate formed from a resin such as polycarbonate or a glass substrate.

The liquid crystal layer 20 contains liquid crystal molecules. The liquid crystal molecules preferably have a positive anisotropy of dielectric constant ($\Delta\varepsilon$) defined by the following formula (L) (positive type liquid crystal molecules). The liquid crystal molecules preferably align homogeneously in the state where no voltage is applied (in the state with no voltage applied). The direction of the major axes of the liquid crystal molecules in the state with no voltage applied is also referred to as the initial alignment direction of the liquid crystal molecules. The state with no voltage applied includes the states where the voltage applied to the liquid crystal layer is lower than the threshold of the liquid crystal molecules.

Δε=(dielectric constant in major axis direction of liquid crystal molecules)−(dielectric constant in minor axis direction of liquid crystal molecules) (L)

The color filter substrate 30 includes a second substrate 31, a black matrix 33, a color filter layer with color filters 32, a third electrode 34, and a fourth electrode 35. In Embodiment 1, as shown in FIG. 4, a case is described where the color filter substrate 30 sequentially includes the second substrate 31, the black matrix 33, the color filters 32, and a first dielectric layer 50, and the third electrode 34 and the fourth electrode 35 are arranged on the first dielectric layer 50.

Application of driving voltage to the third electrode 34 generates an electric field in the thickness direction of the liquid crystal layer 20 and thus enables switching between the privacy mode and the public mode. The display method is described later. The third electrode 34 may be formed from a transparent conductive material. Examples of the transparent conductive material include ITO and IZO.

As shown in FIG. 1 and FIG. 2, the third electrode 34 includes second linear electrodes 34a. The second linear electrodes 34a in a plan view extend in the second direction D2 that intersects the first direction D1 and each overlap a portion of the black matrix 33 extending in the second direction D2. The first direction D1 is the direction in which the first linear electrode 14a of each second electrode 14 extends. The second linear electrodes 34a are also considered to form stripes horizontal to the first direction D1. The second linear electrodes 34a may be arranged along the ends of each sub-pixel in the second direction D2 (the top and bottom ends of each sub-pixel in FIG. 1 and FIG. 2). With such second linear electrodes 34a forming horizontal stripes, for example, the privacy can be enhanced as compared with the cases where the second electrodes 34a extend in the same direction as the first direction D1 (when they form vertical stripes) or are arranged in the same pattern as the black matrix. Specifically, the front contrast ratio during display in the privacy mode can be increased and the contrast ratio in the horizontal direction (for example, the contrast ratio when the screen is observed at the 0°-180° azimuth and a polar angle of 45°) can be decreased.

Preferably, the second linear electrodes 34a do not overlap the optical openings in a plan view. With such portions of the third electrode 34 not overlapping the optical openings, the vertical electric fields are less likely to work in the openings in the sub-pixels during display in the public mode, so that a high transmittance and a high contrast ratio can be achieved.

The angle θ1 formed by the first direction D1 and the second direction D2 is preferably 80° or greater and 100° or smaller, more preferably 85° or greater and 95° or smaller. The second direction D2 may be parallel to the absorption axis 62A of the second polarizing plate 62 or the absorption axis 61A of the first polarizing plate 61. In Embodiment 1, as shown in FIG. 1, the second direction D2 is parallel to the absorption axis 62A of the second polarizing plate 62 (at the 0°-180° azimuth).

The second linear electrodes 34a are preferably electrically connected to one another. The second linear electrodes 34a may be, for example, connected by the connection portions at the ends of the liquid crystal panel.

Since the second linear electrodes 34a overlap the black matrix 33, in a conventional liquid crystal display device, application of voltage to the electrodes in the color filter substrate including the black matrix can cause charging of the black matrix, which may decrease the front contrast ratio in the privacy mode. In contrast, in the present embodiment, as described later, the color filter substrate 30 includes the fourth electrode 35 which is a floating electrode, so that a decrease in front contrast ratio in the privacy mode can be reduced or prevented.

The gate lines 1 described above may extend in the second direction D2 in which the second linear electrodes 34a extend. At least part of each of the second linear electrodes 34a may overlap a gate line 1 in a plan view. For enhancement of the privacy, the width of each second linear electrode 34a may be greater than the width of each gate line 1.

The width of each second linear electrode 34a is preferably 5 μm or greater. The upper limit of the width of each second linear electrode 34a may be any value with which the second linear electrode 34a does not overlap an optical opening and may be 50 μm, for example. The lower limit of the width of each second linear electrode 34a is more preferably 15 μm, the upper limit thereof is more preferably 40 μm. The width of each second linear electrode 34a means the electrode width in a direction perpendicular to the second direction D2.

The third electrode 34 may further include a third linear electrode 34b between the second linear electrodes 34a. The third linear electrode 34b preferably extends in the second direction D2 and overlaps the optical openings of the respective sub-pixels in a plan view. With the third electrode 34 including the third linear electrode 34b, an increase in the contrast ratio in observation from the horizontal direction can be further reduced or prevented while the high front contrast ratio is maintained. There may be one third linear electrode 34b or two or more third linear electrodes 14b which overlap(s) the optical openings of the respective sub-pixels.

When there is a plurality of third linear electrodes 34b, the third linear electrodes 34b are preferably electrically connected to one another. The third linear electrodes 34b may be, for example, connected by connection portions at the ends of the liquid crystal panel. The third linear electrodes 34b are preferably electrically connected to the second linear electrodes 34a, and the same voltage is preferably applied to the entire third electrode 34.

The width of the third linear electrode 34b is preferably smaller than the width of each second linear electrode 34a. The width of the third linear electrode 34b is preferably 2.5 μm or greater and 12 μm or smaller. With the width of the third linear electrode 34b in the above range, in the privacy mode, the front contrast ratio can be increased while an increase in the contrast ratio in the horizontal direction can be sufficiently reduced or prevented. The lower limit of the width of the third linear electrode 34b is more preferably 3 μm, and the upper limit thereof is more preferably 7 μm. For a further increase in the front contrast ratio in the public mode, the width of the third linear electrode 34b is more preferably 7 μm or smaller. The width of the third linear electrode 34b means the electrode width in a direction perpendicular to the second direction D2.

When there is a plurality of third linear electrodes 34b, the third linear electrodes 34b are preferably equally spaced from one another. The distance between adjacent third linear electrodes 34b is preferably 2.5 μm or longer and 7 μm or shorter. The lower limit of the distance between adjacent third linear electrodes 34b is more preferably 3 μm, and the upper limit thereof is more preferably 5 μm.

The color filter substrate 30 includes the fourth electrode 35 which is a floating electrode. A floating electrode is not electrically connected to another electrode or a power source. The electric potential of a floating electrode depends on the total capacitance of nearby electrodes. The fourth electrode 35 is electrically connected to none of the first electrode 12, the second electrodes 14, and the third electrode 34. The fourth electrode 35 is formed from, for example, a transparent conductive material such as ITO or IZO.

With no fourth electrode 35, application of voltage to the third electrode 34 in the color filter substrate generates an electric field that is not parallel or perpendicular to the absorption axes of the polarizing plates, between the charged black matrix 33 and the electrodes in the active matrix substrate in a plan view. This electric field shifts the major axes (director) of the liquid crystal molecules off the absorption axes of the polarizing plates, so that the liquid crystal molecules may be misaligned and light leakage (decrease in black level) may occur when the screen is observed from the front in black display. This may decrease the front contrast ratio in the privacy mode. In contrast, in the present embodiment, the third electrode 34 and the fourth electrode 35 are arranged between the black matrix 33 and the liquid crystal layer 20, and the fourth electrode 35 is disposed between adjacent second linear electrodes 34a in a plan view and overlaps at least part of the black matrix 33. This, even with the charged black matrix 33, can block the flow of the electric field from the third electrode 34 toward the black matrix 33 or reducing the intensity of the electric field, thus reducing the action of the electric field on the liquid crystal layer 20 (see FIG. 22). As a result, generation of an electric field shifted from the absorption axes of the polarizing plates can be reduced or prevented between the black matrix 33 and the electrodes in the active matrix substrate 10, so that a high front contrast ratio can be maintained.

The fourth electrode 35 is preferably disposed in the same layer as the third electrode 34 or between the third electrode 34 and the black matrix 33. FIG. 4 shows, as an example of a case where the fourth electrode 35 is disposed in the same layer as the third electrode 34, a case where the third electrode 34 and the fourth electrode 35 are both formed on the first dielectric layer 50. Being "in the same layer" means not being on top of each other in a cross sectional view of the liquid crystal panel, and a layer such as an insulating layer is not present between the third electrode 34 and the fourth electrode 35. Arranging the third electrode 34 and the fourth electrode 35 in the same layer enables reduction in the number of production steps and thus reduction in the production cost.

In Embodiment 1, as shown in FIG. 1 and FIG. 2, the fourth electrode 35 extends in the second direction D2 and includes fourth linear electrodes 35a overlapping the optical openings of the respective sub-pixels. The fourth linear electrodes 35a each are disposed between one of the second linear electrodes 34a and the third linear electrode 34b in a plan view. When there is a plurality of third linear electrodes 34b, preferably, the fourth linear electrodes 35a include at least one disposed between a second linear electrode 34a and a third linear electrode 34b or between adjacent third linear electrodes 34b. The fourth linear electrodes 35a may be independent of one another without being electrically connected to one another in a plan view.

In a plan view, the fourth linear electrodes 35a of the fourth electrode 35 each are preferably disposed between a second linear electrode 34a and a third linear electrode 34b of the third electrode 34 or between adjacent third linear electrodes 34b.

The fourth linear electrodes 35a may include one disposed between a second linear electrode 34a and a third linear electrode 34b and one disposed between adjacent third linear electrodes 34b in a plan view. Also, in a plan view, the fourth linear electrodes 35a and the second linear electrodes 34a and/or the third linear electrode 34b are more preferably alternately arranged. This arrangement causes the electric fields generated in the liquid crystal layer 20 to be substantially parallel or substantially perpendicular to the absorption axis of a polarizing plate in a plan view, thus reducing or preventing light leakage in observation from the front in black display in the privacy mode. The arrangement therefore enables a decrease in contrast ratio from an oblique direction while increasing the front contrast ratio in the privacy mode, leading to enhancement of the privacy. The direction in which the electrodes are alternately arranged may lie in the first direction D1, for example.

The width W35a of each fourth linear electrode 35a is preferably 2.5 μm or greater and 5 μm or smaller. The lower limit of the width W35a of each fourth linear electrode 35a is more preferably 3 μm, and the upper limit thereof is more preferably 4 μm. The width W35a of each fourth linear electrode 35a is the electrode width in a direction perpendicular to the second direction D2.

When, in a plan view, the distance between a second linear electrode 34a and a fourth linear electrode 35a adjacent to each other is d1 and the distance between a third linear electrode 34b and a fourth linear electrode 35a adjacent to each other is d2, the distances d1 and d2 each are preferably 2 μm or longer and 7 μm or shorter. With the distances d1 and d2 in the respective ranges, an increase in the contrast ratio in the horizontal direction in the privacy mode can be favorably reduced or prevented. The lower limit of each of the distances d1 and d2 is more preferably 3 μm, and the upper limit thereof is more preferably 4 μm. For an increase in the front contrast ratio in the privacy mode, the distances d1 and d2 each are more preferably 7.5 μm or shorter. The distances d1 and d2 each are the distance in a direction perpendicular to the second direction D2.

The color filters 32 coincide with the optical openings in the respective sub-pixels in observation from the front of the liquid crystal panel 100A. The color filters 32 include, for example, red color filters 32R, green color filters 32G, and blue color filters 32B. The color filters 32, for example, may include color filters of the same color consecutively formed in the row direction or column direction of the liquid crystal panel 100A. The color filters 32 preferably define a dielectric layer.

The black matrix 33 is disposed between adjacent sub-pixels. The black matrix 33 may be disposed between adjacent optical openings in the row or column direction or may surround the optical openings in a plan view. The black matrix 33 may be one usually used in the field of liquid crystal display devices, and is preferably formed from a resin, more preferably a black resin containing a black pigment or dye. The resistivity of the black matrix 33 is, for example, $1.0 \times 10^{10}$ to $1.0 \times 10^{13}$ (Ω·cm).

The first dielectric layer 50 is preferably between the black matrix 33 and the third electrode 34. With the first dielectric layer 50, the black matrix 33 is spaced from the third electrode 34. This structure can reduce charging of the black matrix 33 due to voltage application to the third electrode 34. The dielectric constant ε of the first dielectric layer 50 may be, for example, ε=3 to 4.

The first dielectric layer 50 is a layer different from the color filters 32 and is formed from a resin transparent to light, for example. The total light transmittance of the first dielectric layer 50 is preferably 80% or higher. Herein, the total light transmittance is measured in conformity with JIS K7361-1. The first dielectric layer 50 can be formed from, for example, a resin such as an acrylic resin or a polyimide-based resin.

The thickness of the first dielectric layer 50 is preferably 0.5 µm or greater and 4 µm or smaller. Too thick the first dielectric layer 50 may cause oblique chromatic parallax, leading to a failure in displaying the desired color. With a thickness of the first dielectric layer 50 of 4 µm or greater, the surface of the first dielectric layer 50 is likely to be uneven, which may lead to display unevenness.

Although not shown, alignment films may be disposed, one between the active matrix substrate 10 and the liquid crystal layer 20 and the other between the color filter substrate 30 and the liquid crystal layer 20. The alignment films control the initial alignment azimuth of the liquid crystal molecules with no voltage applied. The alignment films are preferably horizontal alignment films. Horizontal alignment films each preferably provide an initial pre-tilt angle (with no voltage applied to the liquid crystal layer) of 0° to 1° from the surface thereof to the liquid crystal molecules.

A first polarizing plate 61 facing the liquid crystal layer 20 across the active matrix substrate 10 and a second polarizing plate 62 facing the liquid crystal layer 20 across the color filter substrate 30 may be disposed. The first polarizing plate 61 and the second polarizing plate 62 are preferably arranged with their absorption axis 61A and absorption axis 62A being perpendicular to each other, i.e., in crossed Nicols. FIG. 1 shows that the absorption axis 62A of the second polarizing plate 62 is at the 0°-180° azimuth and the absorption axis 61A of the first polarizing plate 61 is at the 90°-270° azimuth. The first polarizing plate 61 and the second polarizing plate 62 are preferably linearly polarizing plates.

Figure 5:
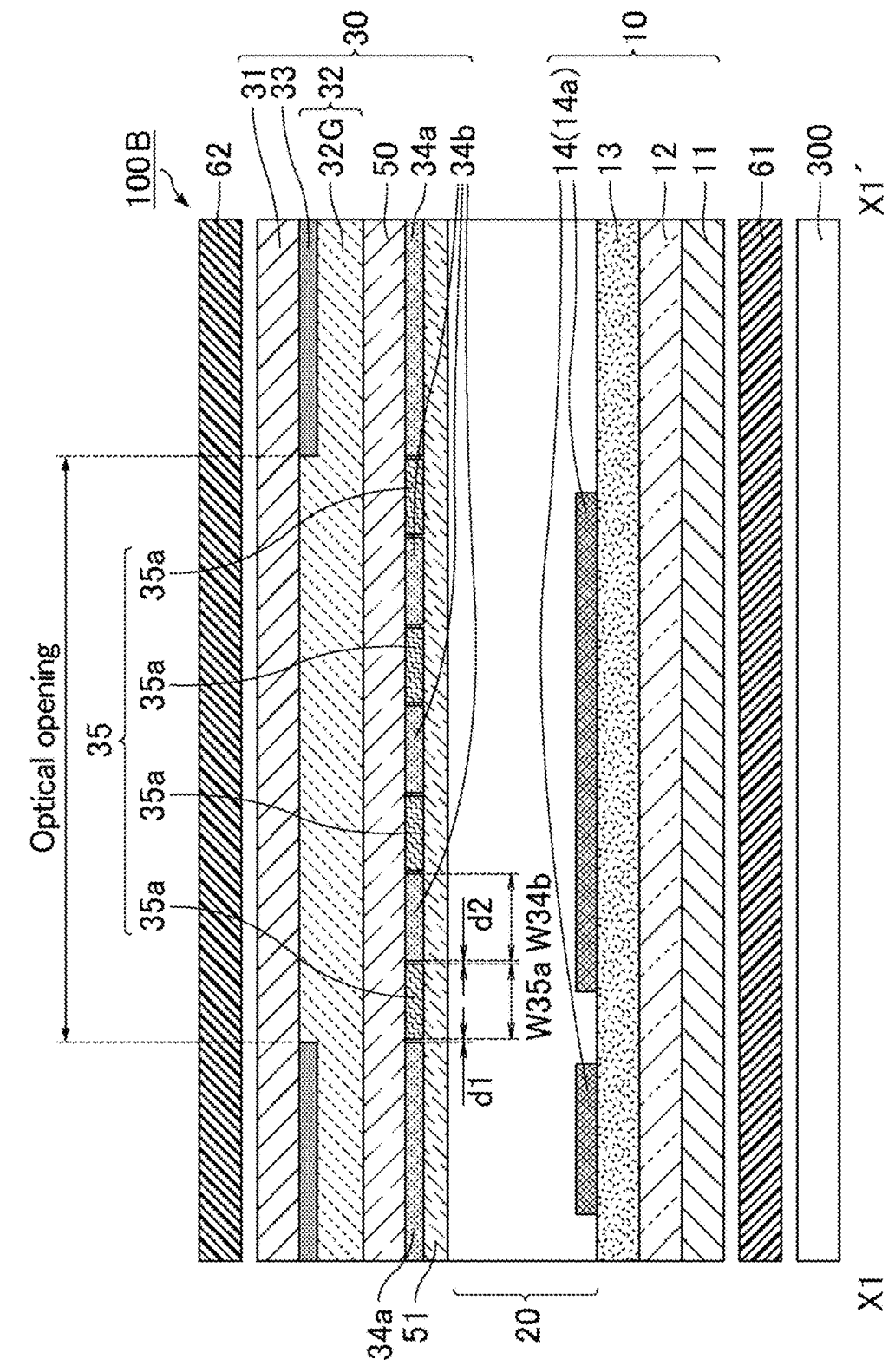
FIG. 5 is a schematic cross-sectional view showing an example in which a dielectric layer (second dielectric layer) is disposed in the liquid crystal panel in FIG. 4.

FIG. 5 is a schematic cross-sectional view showing an example in which a dielectric layer (second dielectric layer) is disposed in the liquid crystal panel in FIG. 4. As shown in FIG. 5, the liquid crystal panel 100B may include a dielectric layer (second dielectric layer 51) between the third electrode 34 and the liquid crystal layer 20. The second dielectric layer 51 is a layer different from an alignment film and is preferably disposed between the third electrode 34 and the alignment film. FIG. 5 shows a case where the second dielectric layer 51 is disposed between the third electrode 34 (second linear electrodes 34a, third linear electrodes 34b) and the liquid crystal layer 20 and between the fourth electrode 35 (fourth linear electrodes 35a) and the liquid crystal layer 20.

With the second dielectric layer 51, in the public mode, generation of an unnecessary vertical electric field can be reduced or prevented between the third electrode 34 and the electrodes in the active matrix substrate. This enables horizontal electric field driving with almost no rising of the liquid crystal molecules, thus increasing the transmittance in white display at the front and the front contrast ratio during display in the public mode. The second dielectric layer 51 can be formed from the same material as the first dielectric layer 50. The total light transmittance of the second dielectric layer 51 is preferably 80% or higher.

The dielectric constant of the second dielectric layer 51 may be, for example, ε=3 to 4. The thickness of the second dielectric layer 51 is preferably 0.5 µm or greater and 4 µm or smaller. With a thickness of the second dielectric layer 51 of greater than 4 µm, chromatic parallax may occur to decline the display quality.

The liquid crystal display device of Embodiment 1 may include a backlight 300 behind the back surface of the liquid crystal panel (on or behind the active matrix substrate 10). The backlight 300 may be any backlight usually used in the field of liquid crystal display devices. The backlight 300 may be a transmissive backlight or an edge-lit backlight. For further enhancement of the privacy in the privacy mode, the backlight 300 may be a backlight including the later-described shading louver.

The liquid crystal panel of Embodiment 1 may be an in-cell touch panel. When the liquid crystal panel 100A or 100B is an in-cell touch panel, the active matrix substrate 10 may further include touch panel lines. The touch panel lines may, for example, each have substantially the same width as a source line 2 and overlap a source line 2 in a plan view. The touch panel lines may be disposed between the first electrode 12 and the second electrodes 14 in a cross-sectional view. Since the fourth electrode 35 is floating, the signal-to-noise ratio (S/N) can be made high regardless of the resistivity of the fourth electrode 35. Thus, the liquid crystal panel can provide a sufficient capacitance between the finger and the touch panel lines while preventing charging of the black matrix 33.

Embodiment 2

Figure 6:
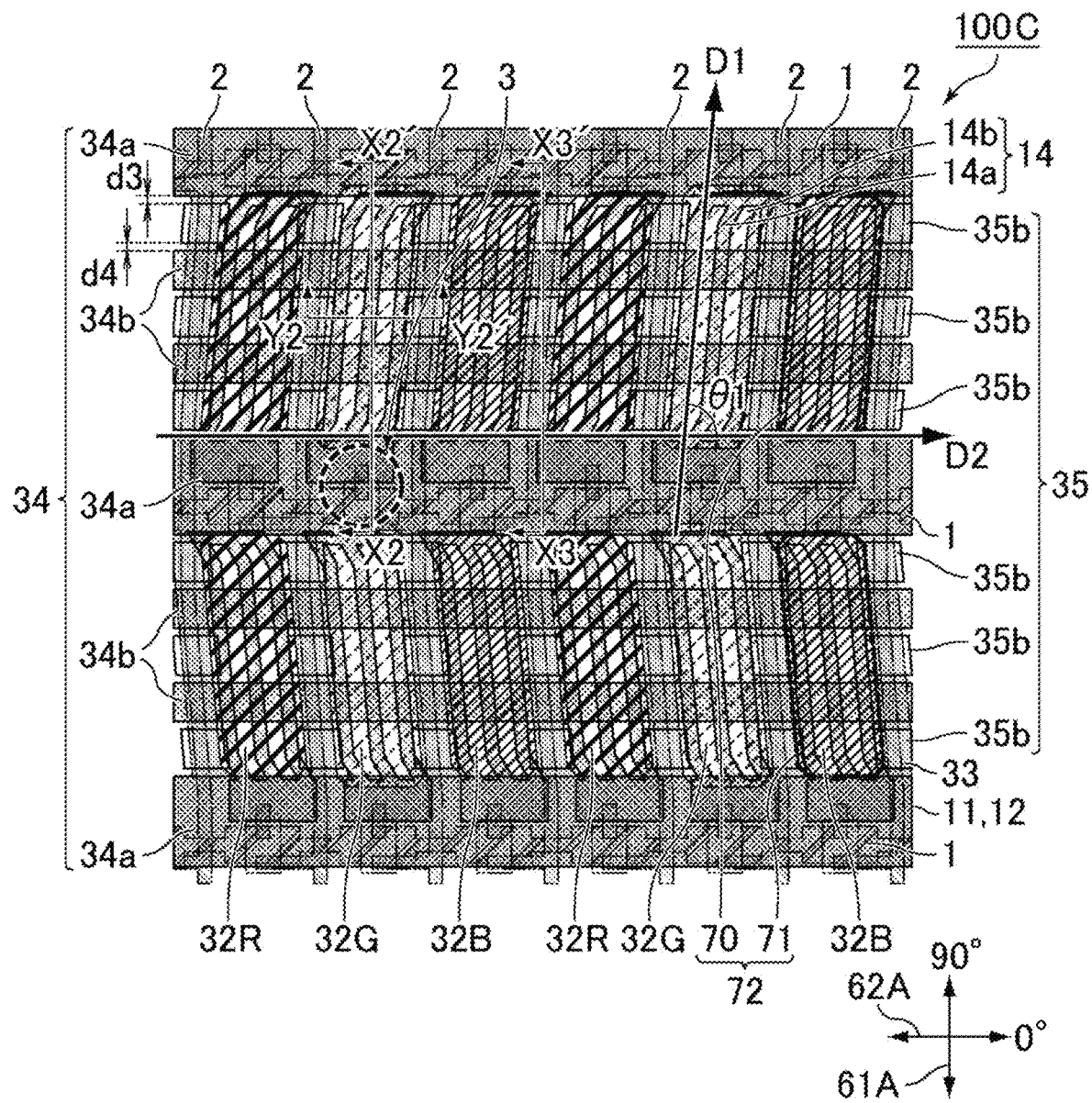
FIG. 6 is a schematic plan view showing an example of a liquid crystal display device of Embodiment 2.
Figure 7:
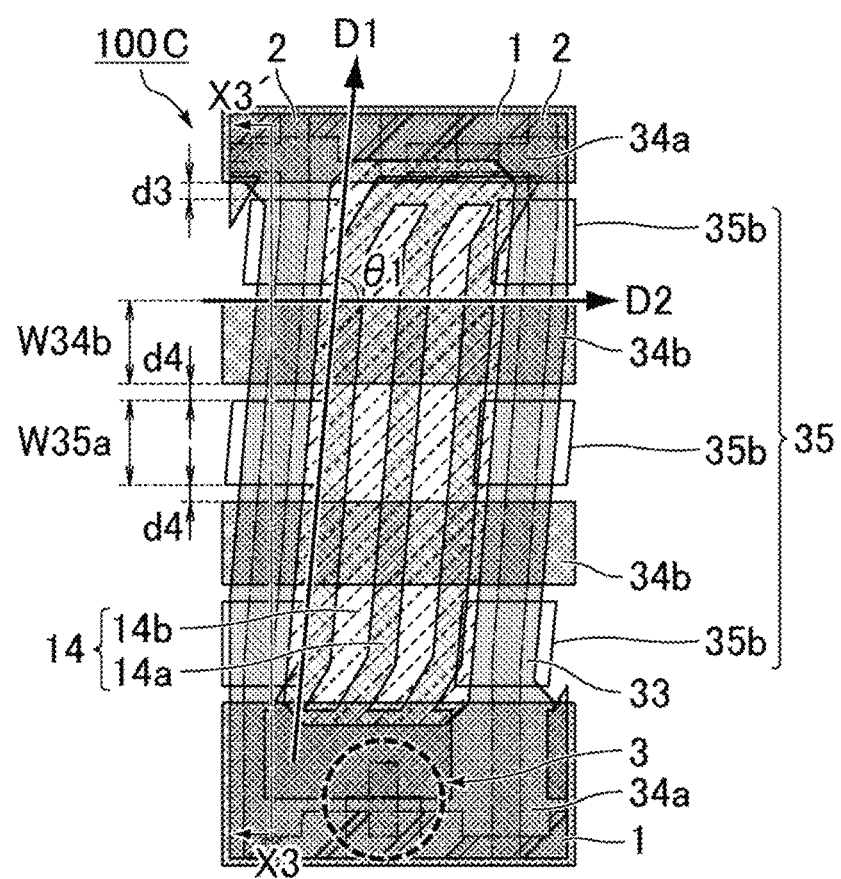
FIG. 7 is a schematic plan view of a sub-pixel in the liquid crystal display device in FIG. 6.

A liquid crystal display device of Embodiment 2 has the same configuration as in Embodiment 1, except for the shape of the fourth electrode. FIG. 6 is a schematic plan view showing an example of a liquid crystal display device of Embodiment 2. FIG. 7 is a schematic plan view of a sub-pixel in the liquid crystal display device in FIG. 6.

As shown in FIG. 6 and FIG. 7, the fourth electrode 35 in a liquid crystal panel 100C of Embodiment 2 includes island electrodes 35b independent of one another in a plan view. Each of the island electrodes 35b in a plan view is disposed between a second linear electrode 34a and a third linear electrode 34b. When there is a plurality of third linear electrodes 34b, the island electrodes 35b include at least one disposed between a second linear electrode 34a and a third linear electrode 34b or between adjacent third linear electrodes 34b.

With the island electrodes 35b which are floating electrodes, generation of an electric field shifted from the absorption axes of the polarizing plates can be reduced or prevented between the black matrix 33 and the electrodes in the active matrix substrate 10, so that occurrence of the light leakage can be prevented. In addition, since the island electrodes 35b overlap the black matrix 33, the area is large where the island electrodes 35b do not overlap the optical openings of the respective sub-pixels in a plan view as compared with that in Embodiment 1. The present embodiment therefore enables an even higher transmittance in white display than Embodiment 1.

Preferably, the island electrodes 35b are not in contact with one another in a plan view and are not electrically connected to one another. The planar shape of each of the island electrodes 35b may be any shape such as a polygon, e.g., a square, a rectangle, or a parallelogram, an oval, or a circle.

The width of each of the island electrodes 35b is preferably 2.5 µm or greater and 7 µm or smaller. The lower limit of the width of each island electrode 35b is more preferably 3.5 µm, and the upper limit thereof is more preferably 5 µm from the manufacturing perspective. The width of each of the island electrodes 35b means the maximum width of the island electrode in a direction perpendicular to the second direction D2.

Figure 8A:
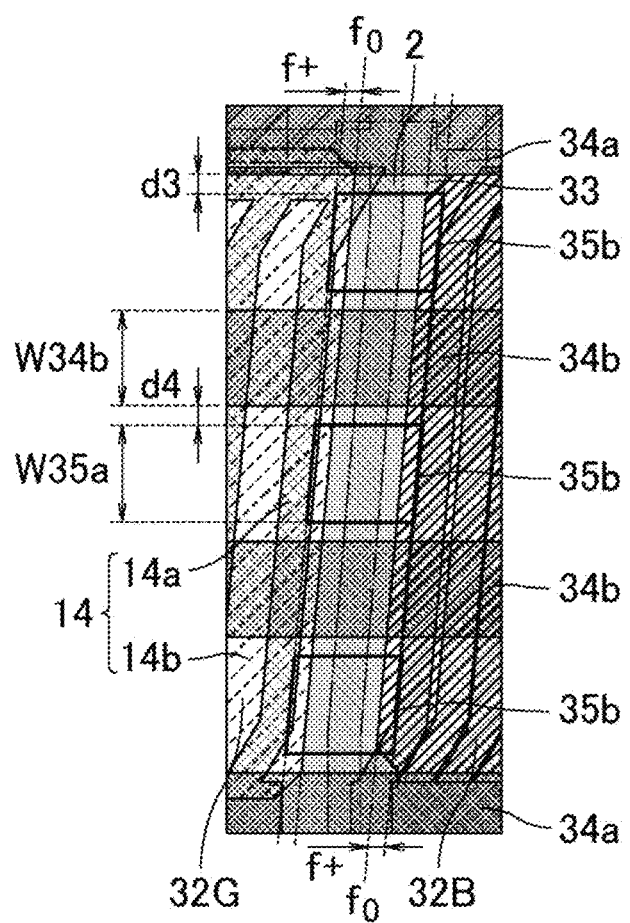
FIG. 8A is an enlarged cross-sectional view of an example of a boundary between adjacent sub-pixels in FIG. 6.
Figure 8B:
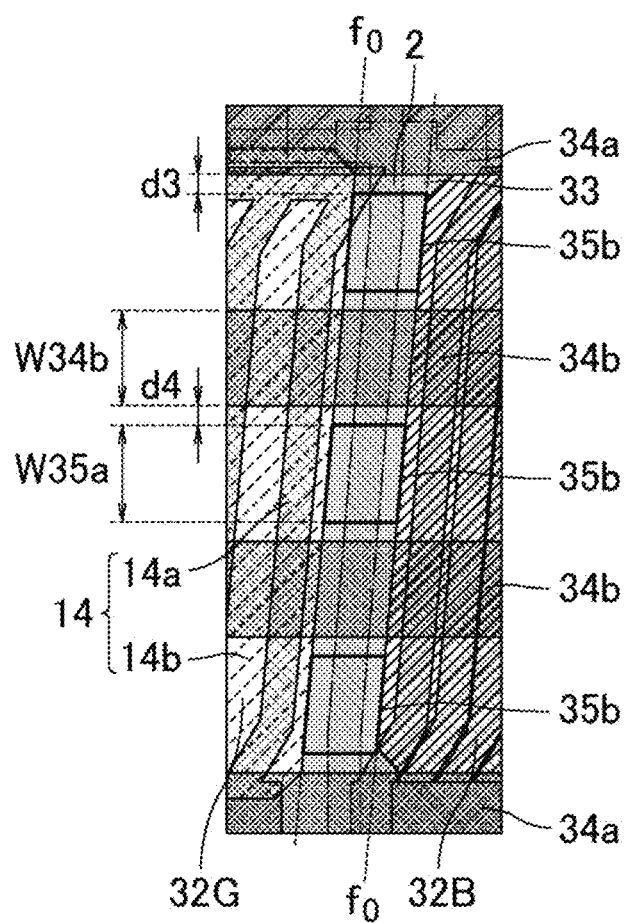
FIG. 8B is an enlarged cross-sectional view of another example of a boundary between adjacent sub-pixels in FIG. 6.
Figure 8C:
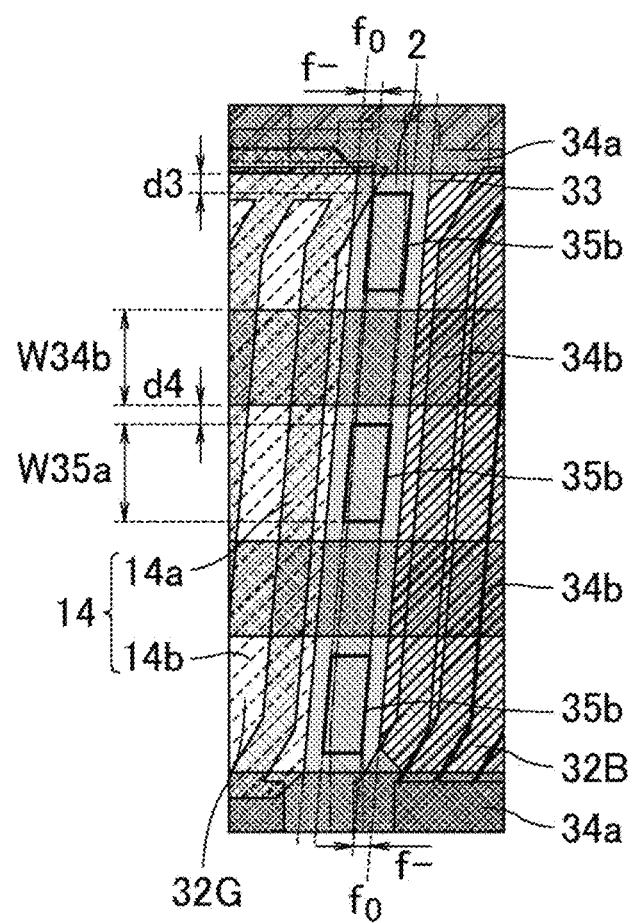
FIG. 8C is an enlarged cross-sectional view of yet another example of a boundary between adjacent sub-pixels in FIG. 6.

FIG. 8A is an enlarged cross-sectional view of an example of a boundary between adjacent sub-pixels in FIG. 6. FIG. 8B is an enlarged cross-sectional view of another example of a boundary between adjacent sub-pixels in FIG. 6. FIG. 8C is an enlarged cross-sectional view of yet another example of a boundary between adjacent sub-pixels in FIG. 6. In FIG. 8A to FIG. 8C, $f_0$ is the reference line when the outer edge of each island electrode 35b coincides with the outer edge of the black matrix 33.

One island electrode 35b may be disposed over two sub-pixels adjacent to each other in the second direction D2. At least part of the island electrode 35b only needs to overlap the black matrix 33. On a straight line lying in the second direction D2 and passing through the optical openings of the respective sub-pixels, the width of the island electrode 35b may be greater than the width of the black matrix 33 as shown in FIG. 8A, the width of the island electrode 35b may be the same as the width of the black matrix 33 as shown in FIG. 8B, or the width of the island electrode 35b may be smaller than the width of the black matrix 33 as shown in FIG. 8C.

FIG. 8A shows a case where in the second direction D2, the outer edge of each island electrode 35b is closer to the optical opening of the sub-pixel than the outer edge of the black matrix 33 is, and part of the island electrode 35b is out of the outer edge of the black matrix 33 to overlap the optical opening of the sub-pixel in the second direction D2. When the width of the island electrode 35b is greater than the width of the black matrix 33, the distance $f^+$ is preferably longer than 0 μm and 5 μm or shorter, wherein $f^+$ is the distance from the outer edge of the island electrode 35b to the outer edge of the black matrix 33 in the second direction D2. The lower limit of the distance $f^+$ is more preferably 0.5 μm, and the upper limit thereof is more preferably 3 μm.

As shown in FIG. 8C, when the width of the island electrode 35b is smaller than the width of the black matrix 33, the distance $f^-$ is preferably longer than 0 μm and 4 μm or shorter, wherein $f^-$ is the distance from the outer edge of the island electrode 35b to the outer edge of the black matrix 33 in the second direction D2. The lower limit of the distance $f^-$ is more preferably 0.5 μm, and the upper limit thereof is more preferably 3 μm.

When the fourth electrode 35 includes the island electrodes 35b, for example, a transparent conductive material such as ITO or IZO may be used. When the width of each of the island electrodes 35b is equal to or smaller than the width of the black matrix 33, a material such as aluminum or molybdenum nitride may be used.

Figure 9:
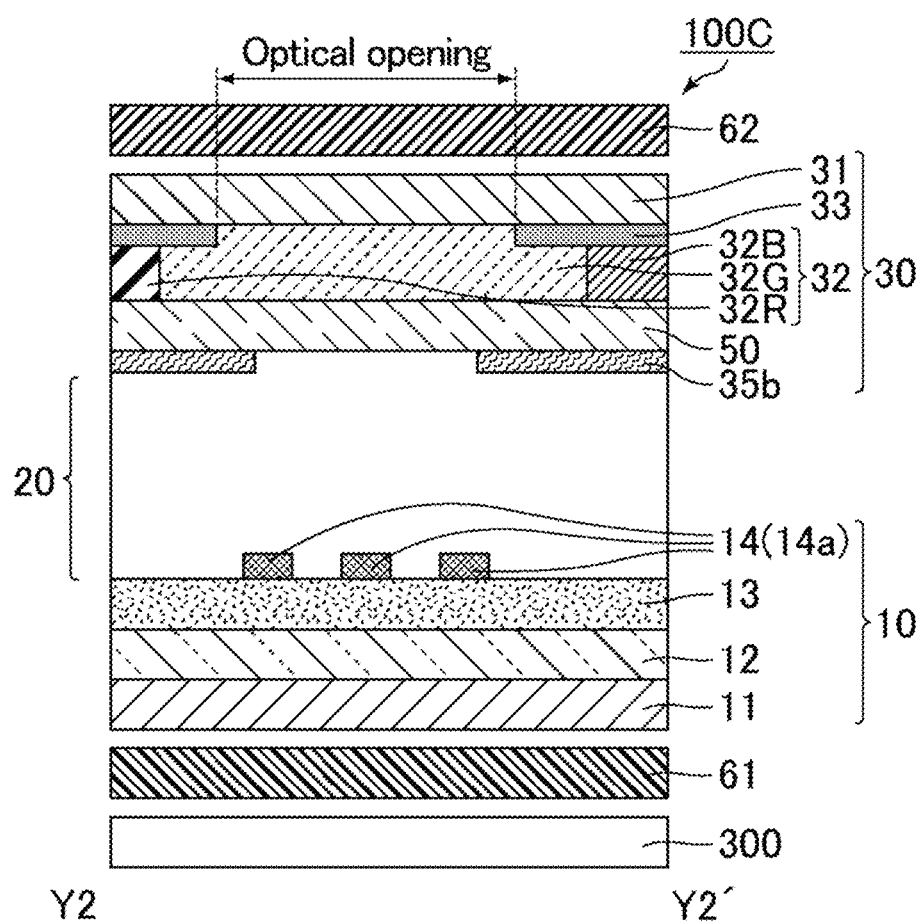
FIG. 9 is a schematic cross-sectional view taken along line Y2-Y2' in FIG. 6.
Figure 10:
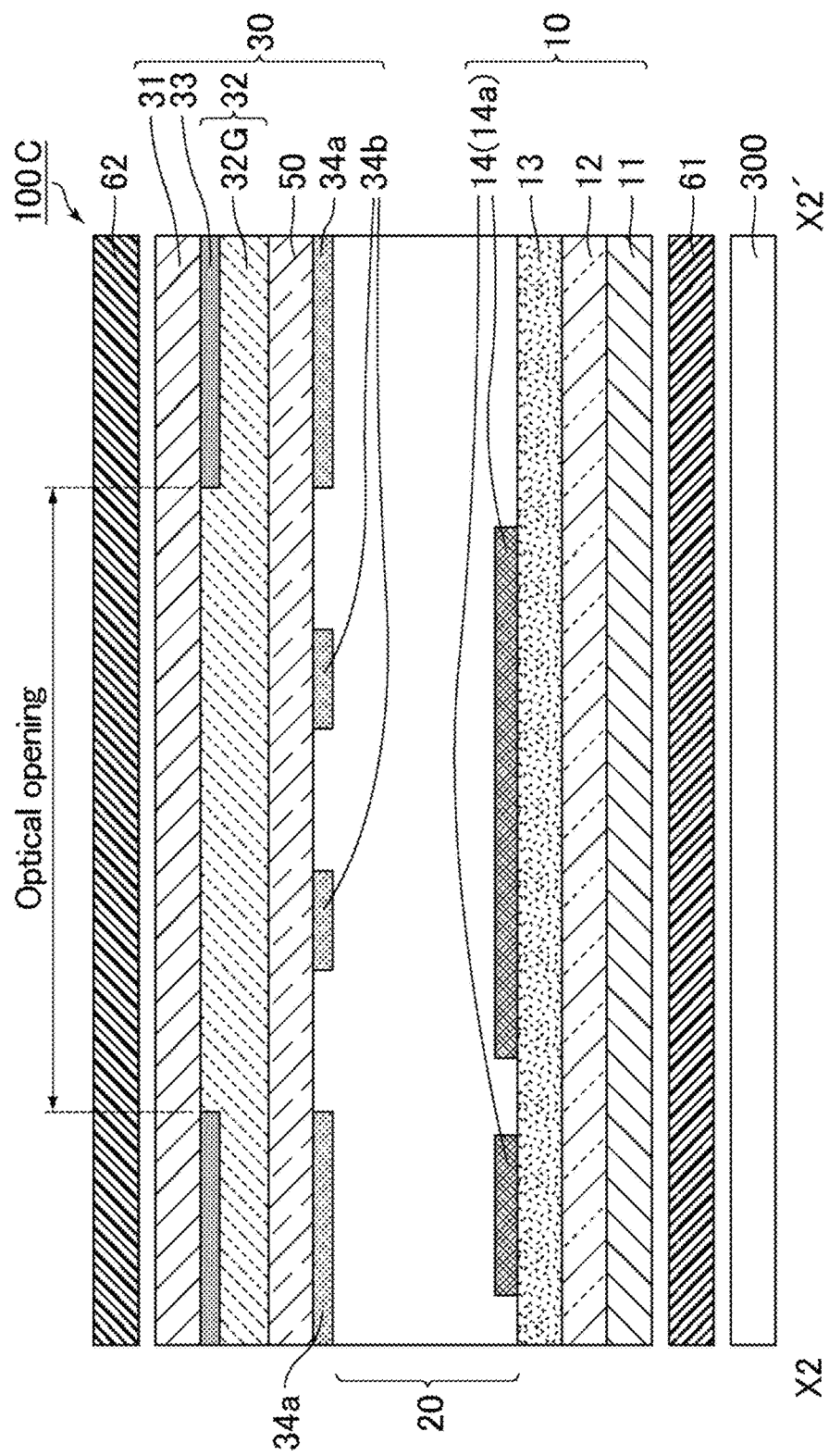
FIG. 10 is a schematic cross-sectional view taken along line X2-X2' in FIG. 6.
Figure 11:
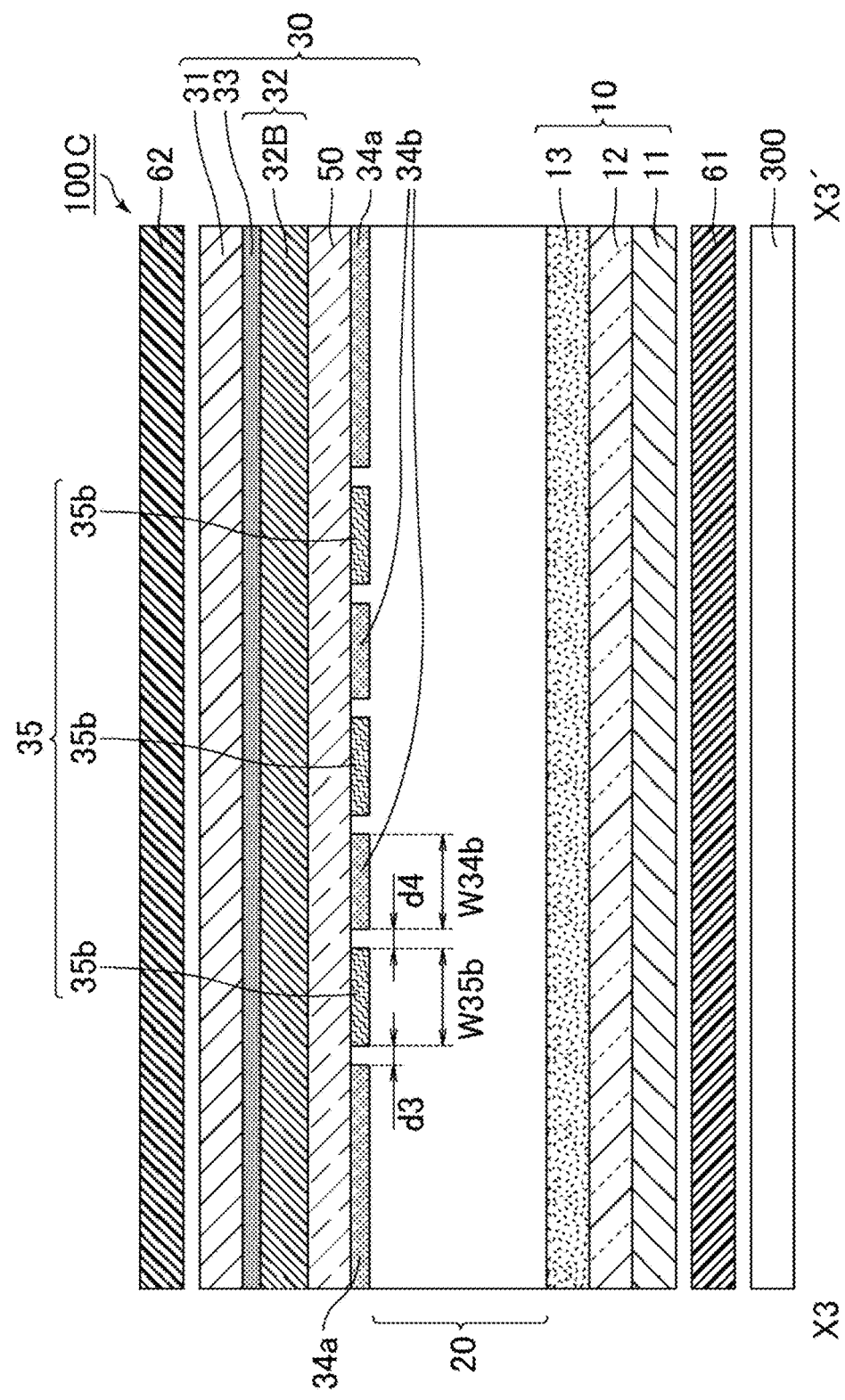
FIG. 11 is a schematic cross-sectional view taken along line X3-X3' in FIG. 6.

The island electrodes 35b may be arranged along the outer edge of the black matrix 33. FIG. 9 is a schematic cross-sectional view taken along line Y2-Y2' in FIG. 6. As shown in FIG. 6 and FIG. 9, the island electrodes 35b may be arranged along the two outer edge lines of the black matrix 33 across the optical opening of one sub-pixel. FIG. 10 is a schematic cross-sectional view taken along line X2-X2' in FIG. 6. FIG. 11 is a schematic cross-sectional view taken along line X3-X3' in FIG. 6. As shown in FIG. 6 and FIG. 10, there is preferably a portion where an island electrode 35b does not overlap the optical opening.

As shown in FIG. 6 and FIG. 11, the second linear electrodes 34a and/or the third linear electrodes 34b and the island electrodes 35b are preferably arranged alternately. This arrangement enables, as described in Embodiment 1, the electric fields generated in the liquid crystal layer 20 to be substantially parallel or substantially perpendicular to the absorption axis of a polarizing plate in a plan view. As a result, in the privacy mode, a high front contrast ratio and a low contrast ratio from an oblique direction can be achieved, so that the privacy can be enhanced. The direction in which the electrodes are alternately arranged may be, for example, the first direction D1.

The distances d3 and d4 each are preferably 2.5 μm or longer and 5 μm or shorter, wherein d3 is the distance between a second linear electrode 34a and an island electrode 35b adjacent to each other in a plan view and d4 is the distance between a third linear electrode 34b and an island electrode 35b adjacent to each other in a plan view. With the distances d3 and d4 falling within the respective ranges, an increase in contrast ratio in the horizontal direction in the privacy mode can be favorably reduced or prevented. The lower limit of each of the distances d3 and d4 is more preferably 3 μm, and the upper limit thereof is more preferably 4 μm. For an increase in front contrast ratio in the privacy mode, the distances d3 and d4 each are more preferably 4 μm or shorter. The distances d3 and d4 each are the distance in a direction perpendicular to the second direction D2.

Figure 12:
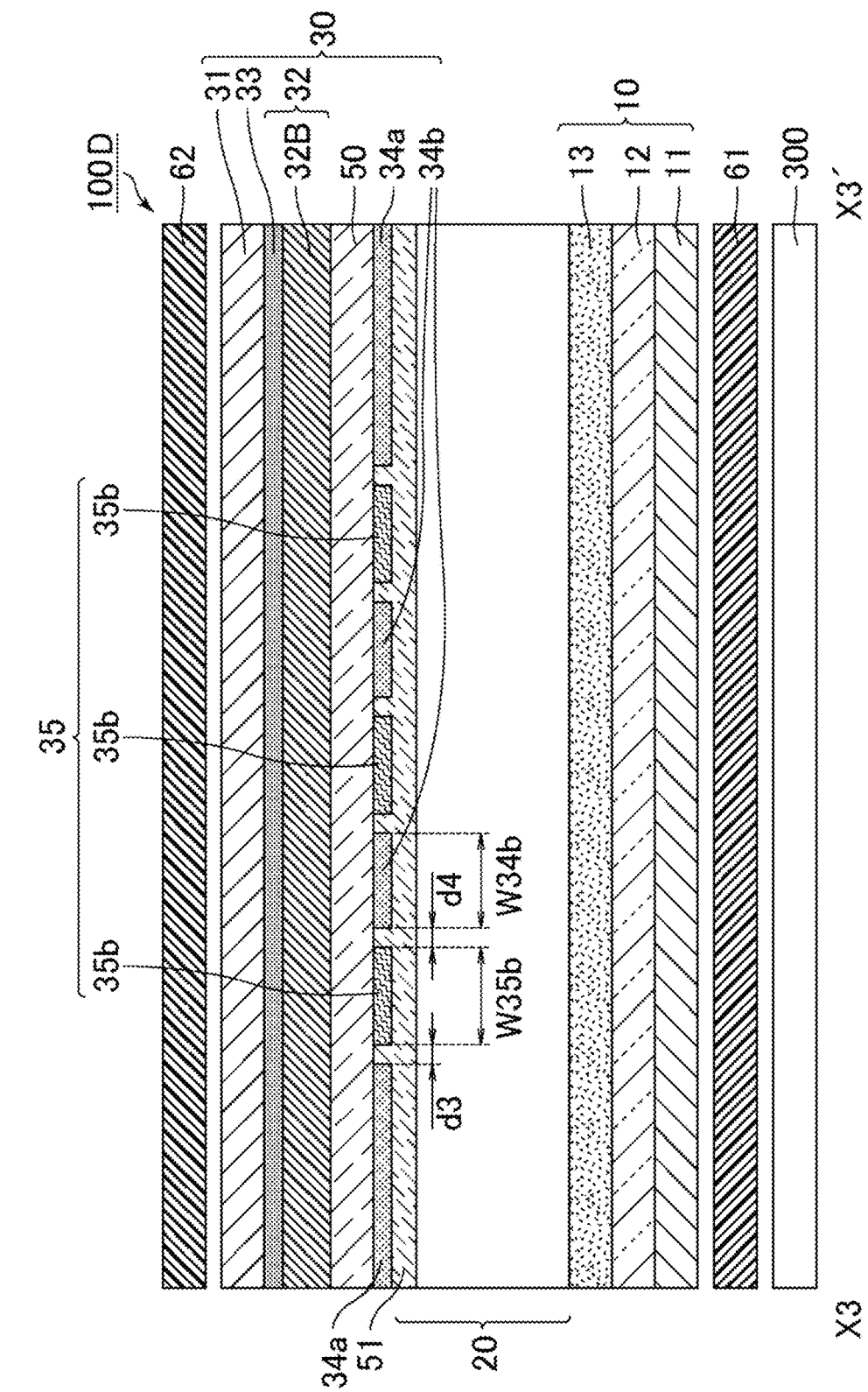
FIG. 12 is a schematic cross-sectional view showing an example in which a dielectric layer (second dielectric layer) is disposed in the liquid crystal panel in FIG. 11.

FIG. 12 is a schematic cross-sectional view showing an example in which a dielectric layer (second dielectric layer) is disposed in the liquid crystal panel in FIG. 11. A liquid crystal panel 100D in FIG. 12 includes a second dielectric layer 51 between the third electrode 34 (second linear electrodes 34a, third linear electrodes 34b) and the liquid crystal layer 20 and between the fourth electrode 35 (island electrodes 35b) and the liquid crystal layer 20.

Embodiment 3

The following Embodiment 3 relates to the control circuit, display method, and veil-view display of a liquid crystal display device.

(Control Circuit)

The control circuit can switch between a first display mode and a second display mode. The first display mode allows a first image to be observed in a narrow viewing angle range including a direction normal to the liquid crystal panel. The second display mode allows the first image to be observed in a wide viewing angle range including the narrow viewing angle range.

Herein, the first display mode is also referred to as the privacy mode, and the second display mode is also referred to as the public mode. In the narrow viewing angle range, the contrast ratio is preferably 5 or lower when the liquid crystal panel is observed from the horizontal direction (azimuth of 0° or azimuth of 180°) at a certain polar angle. The polar angle is preferably 60° or greater, more preferably 45° or greater, still more preferably 30° or greater, when, for example, a direction vertical to the surface of the liquid crystal panel is set at a polar angle of 0° and a direction horizontal to the surface of the liquid crystal panel is set at a polar angle of 90°. The wide viewing angle range means a polar angle range wider than the polar angle range defining the narrow viewing angle range.

Figure 13:
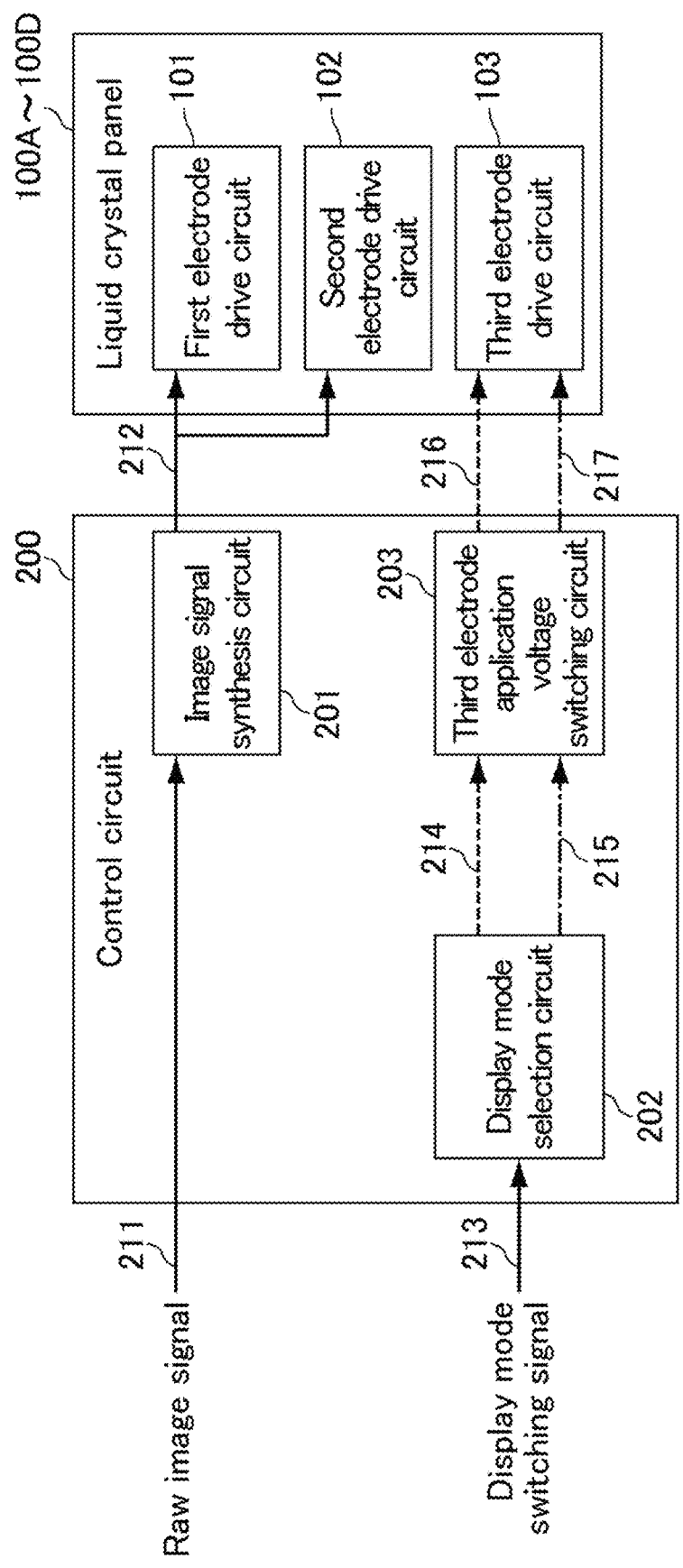
FIG. 13 is a block diagram schematically showing a display method in the first display mode and the second display mode in Embodiment 3.

FIG. 13 is a block diagram schematically showing a display method in the first display mode and the second display mode in Embodiment 3. As shown in FIG. 13, the liquid crystal display device of Embodiment 3 includes a liquid crystal panel and a control circuit 200. The liquid crystal panel may be any one of the liquid crystal panels 100A to 100D described in Embodiments 1 and 2.

The liquid crystal panel may include a first electrode drive circuit 101 that applies voltage to the first electrode 12, a second electrode drive circuit 102 that applies voltage to the second electrodes 14, and a third electrode drive circuit 103 that applies voltage to the third electrode 34. The control circuit 200 may include an image signal synthesis circuit 201, a display mode selection circuit 202, and a third electrode application voltage switching circuit 203.

The control circuit 200 applies driving voltage to the third electrode 34 in the first display mode (privacy mode) and applies constant voltage to the third electrode 34 in the second display mode (public mode). The constant voltage is alternating voltage and can be set to a certain voltage regardless of the magnitude of impedance of the third electrode 34. The constant voltage to the third electrode 34 is regarded as common voltage to determine the voltage (alternating voltage) to be applied to the first electrode 12 and the second electrode 14. With the constant voltage taken as the common voltage Vcom=0 V, for example, application of Vcom voltage to the first electrode 12 and alternating voltage of Vcom±α [V] (wherein α is a voltage of 0 V or higher at a frequency of 60 Hz) as the driving voltage to the second electrodes 14 generates between the first electrode 12 and the second electrodes 14 a fringe electric field whose direction is reversed with 60-Hz intervals.

In the privacy mode of the liquid crystal panel, the driving voltage applied to the third electrode 34 is alternating voltage with a greater effective value than the constant voltage. Application of alternating voltage to the third electrode 34 enables generation of a vertical electric field with the first electrode 12 (or second electrodes 14) to which the common voltage is applied. The driving voltage may be, for example, alternating voltage with a greater effective value than the constant voltage by 3 to 7.5 V. In addition, for reduction or prevention of a phenomenon that an afterimage of the displayed image remains (i.e., image sticking) in the privacy mode, the driving voltage to be applied to the third electrode 34 is preferably alternating voltage of Vcom±α [V] (wherein α is a voltage of 0 V or higher at a frequency of 120 Hz). This suggests that the frequency f1 [Hz] of the driving voltage applied to the second electrodes 14 and the frequency f2 [Hz] of the driving voltage applied to the third electrode 34 are in the relationship: 2× f1=f2.

The image signal synthesis circuit 201, for example, receives a raw image signal 211 for displaying a desired image and outputs an image signal 212 corresponding to the received raw image signal 211 to the first electrode drive circuit 101 and the second electrode drive circuit 102.

The display mode selection circuit 202 receives a display mode switching signal 213 for switching between the first display mode and the second display mode. When the first display mode is selected, the display mode selection circuit 202 outputs a first display mode selection signal 214 to the third electrode application voltage switching circuit 203. When the second display mode is selected, the display mode selection circuit 202 outputs a second display mode selection signal 215 to the third electrode application voltage switching circuit 203.

The third electrode application voltage switching circuit 203 inputs a driving voltage signal 216 or a constant voltage signal 217 to the third electrode drive circuit 103 according to the received display mode selection signal so as to switch between application of alternating voltage and application of constant voltage to the third electrode 34. When receiving a first display mode selection signal 214 from the display mode selection circuit 202, the third electrode application voltage switching circuit 203 outputs a driving voltage signal 216 to the third electrode drive circuit 103 so as to apply a predetermined alternating voltage to the third electrode 34. When receiving a second display mode selection signal 215 from the display mode selection circuit 202, the third electrode application voltage switching circuit 203 outputs a constant voltage signal 217 to the third electrode drive circuit 103 so as to apply a predetermined constant voltage to the third electrode 34.

(Display Method)

An example of the display method of the first display mode and the second display mode is described. The liquid crystal molecules align in the direction horizontal to the active matrix substrate 10 with no voltage applied to the liquid crystal layer. The term "horizontal" herein means that the tilt angle (including the pre-tilt angle) of the liquid crystal molecules from the surface of the active matrix substrate 10 or the color filter substrate 30 is 0° to 5°, preferably 0° to 3°, more preferably 0° to 1°. The tilt angle of the liquid crystal molecules means an angle of the major axes of the liquid crystal molecules formed with the surface of the active matrix substrate 10.

In black display in the public mode, the control circuit 200 applies a predetermined alternating voltage as the constant voltage to the third electrode 34. The control circuit 200 applies common voltage which is common to the constant voltage to the second electrodes 14 and the first electrode 12, with the constant voltage set at 0 V. The common voltage to be applied to the second electrodes 14 and the first electrode 12 may be the same as the constant voltage or a voltage lower than the threshold of the liquid crystal molecules relative to the constant voltage may be applied. This state is also referred to as a state with no voltage applied. With no voltage applied, no electric field is generated that drives liquid crystal molecules in the liquid crystal layer 20, and thus the liquid crystal molecules align at the initial alignment azimuth. This means that the alignment azimuth of the liquid crystal molecules does not vary in the plane of the liquid crystal layer 20, so that the liquid crystal panel does not transmit light from the back surface to provide black display. The black display is the display state with the lowest luminance (grayscale value of 0). The white display is the display state with the highest luminance (grayscale value of 255). The initial alignment azimuth is preferably parallel to the active matrix substrate 10 and, in a plan view, parallel to the absorption axis 61A of the first polarizing plate 61 or the absorption axis 62A of the second polarizing plate 62.

In white display in the public mode, for example, the control circuit, with the constant voltage applied to the third electrode 34, applies constant voltage (common voltage) to one of the first electrode 12 and the second electrodes 14 and alternating voltage with a different effective value from the common voltage to the other. Fringe electric fields are generated between the first electrode 12 and the second electrodes 14, while the electric fields in the thickness direction of the liquid crystal layer 20 are weak unlike in the later-described privacy mode. Thus, the alignment azimuth varies while the liquid crystal molecules align parallel to the active matrix substrate 10 due to the electric fields generated between the first electrode 12 and the second electrodes 14. With the alignment azimuth varying from the initial alignment azimuth as the liquid crystal molecules rotate in the plane of the liquid crystal layer 20, the major axes of the liquid crystal molecules form an angle with the absorption axis 61A of the first polarizing plate or the absorption axis 62A of the second polarizing plate to transmit light from the back surface of the liquid crystal panel. This provides white display.

In black display in the privacy mode, the control circuit applies driving voltage with a different effective value from the constant voltage to the third electrode, and applies constant voltage (common voltage) to the second electrodes 14 and the first electrode 12. Oblique electric fields are generated between the third electrode 34 and the first electrode 12 and between the third electrode 34 and the second electrodes 14. The liquid crystal molecules form an angle with the active matrix substrate 10 due to the oblique electric fields.

Since the alignment azimuth of the liquid crystal molecules does not vary in the plane of the liquid crystal layer 20, the liquid crystal panel does not transmit light from the back surface. Meanwhile, since the liquid crystal molecules are at an angle from the active matrix substrate, the black display of the liquid crystal panel when observed in the wide viewing angle range outside the narrow viewing angle range appears to be more whitish than when observed in the narrow viewing angle range.

In white display in the privacy mode, the control circuit 200, with driving voltage applied to the third electrode 34, applies constant voltage (common voltage) to one of the first electrode 12 and the second electrodes 14 and applies alternating voltage with a different effective value from the common voltage to the other. The driving voltage applied to the third electrode 34 is preferably different from the alternating voltage applied to the first electrode 12 or the second electrodes 14 in effective value, more preferably higher than the alternating voltage applied to the first electrode 12 and the second electrodes 14 in effective value.

The driving voltage applied to the third electrode 34 and the alternating voltage applied to the first electrode 12 or the second electrodes 14 may be different in frequency. The frequency of the driving voltage may be higher than the frequency of the alternating voltage applied to the first electrode 12 or the second electrodes 14. The frequency of the driving voltage may be 60 Hz or 120 Hz, while the frequency of the alternating voltage applied to the first electrode 12 or the second electrodes 14 may be 60 Hz. With a frequency of the driving voltage set at 120 Hz, flicker can be reduced.

Fringe electric fields are generated between the first electrode 12 and the second electrode 14, while electric fields oblique to the thickness direction of the liquid crystal layer 20 are generated between the third electrode 34 and the first electrode 12 or between the third electrode 34 and the second electrodes 14. As a result, electric fields synthesized from the fringe electric fields and the oblique electric fields are generated in the liquid crystal layer 20. The electric fields generated among the first electrode 12, the second electrodes 14, and the third electrode 34 cause the liquid crystal molecules form an angle with the active matrix substrate 10 while varying the alignment azimuth, thus providing white display. Since the liquid crystal molecules form an angle with the active matrix substrate, the first image can be observed in the narrow viewing angle range, while the first image is less observable when the liquid crystal panel is observed in the wide viewing angle range outside the narrow viewing angle range as a result of changes in the image such as a significant decrease in contrast ratio.

In black display and white display in the privacy mode, grayscale display is provided while constant voltage is applied to the third electrode 34 as described above. In a conventional liquid crystal display device, when voltage is applied to an electrode in the color filter substrate, the black matrix in the color filter substrate sometimes suffers charging to generate an electric field shifted from the absorption axes of the polarizing plates between the charged black matrix and the electrodes in the active matrix substrate. Generation of such an electric field in black display in the privacy mode may cause partial misalignment of the liquid crystal molecules, followed by light leakage. Embodiment 1 with the fourth electrode which is floating blocks the flow of the electric field from the third electrode 34 toward the black matrix 33 or reduces the intensity of the electric field, thus reducing or preventing generation of electric fields shifted from the absorption axes of the polarizing plates between the black matrix 33 and the electrodes in the active matrix substrate 10 to prevent occurrence of the light leakage.

The white display in the privacy mode and white display in the public mode can be switched by applying voltage to the third electrode. Similarly, the black display in the privacy mode and the black display in the public mode can be switched by applying voltage to the third electrode. The same applies to grayscale display.

The liquid crystal display device of the present embodiment, as described above, can achieve a high level of privacy protection when the liquid crystal panel is observed from the horizontal direction by switching the mode from the second display mode (public mode) to the first display mode (privacy mode). The horizontal direction is the direction at an azimuth of 0° and an azimuth of 180° when the direction to the right of the liquid crystal panel displaying a desired image is 0° and the angle increases counterclockwise.

(Veil-View Display)

Figure 14:
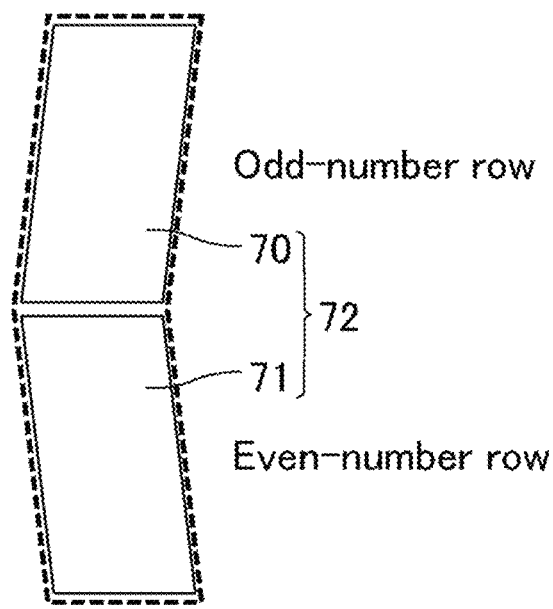
FIG. 14 is a schematic plan view showing an example of a single display unit in the liquid crystal panel.
Figure 15:
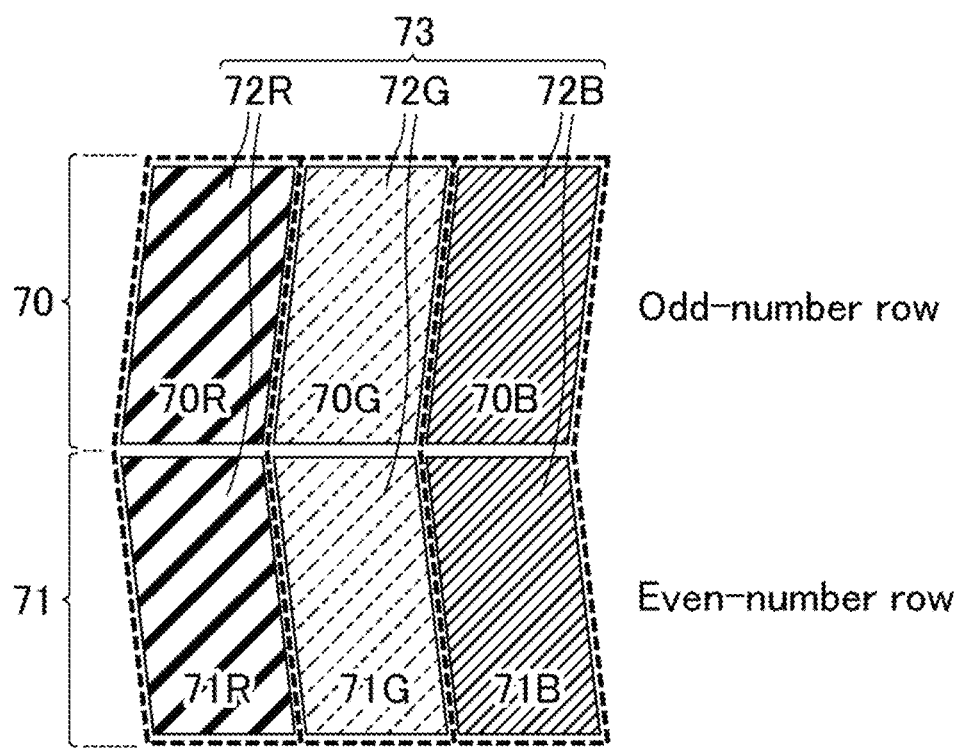
FIG. 15 is a schematic plan view showing an example of a color element for providing color display using a soft veil-view function.
Figure 16:
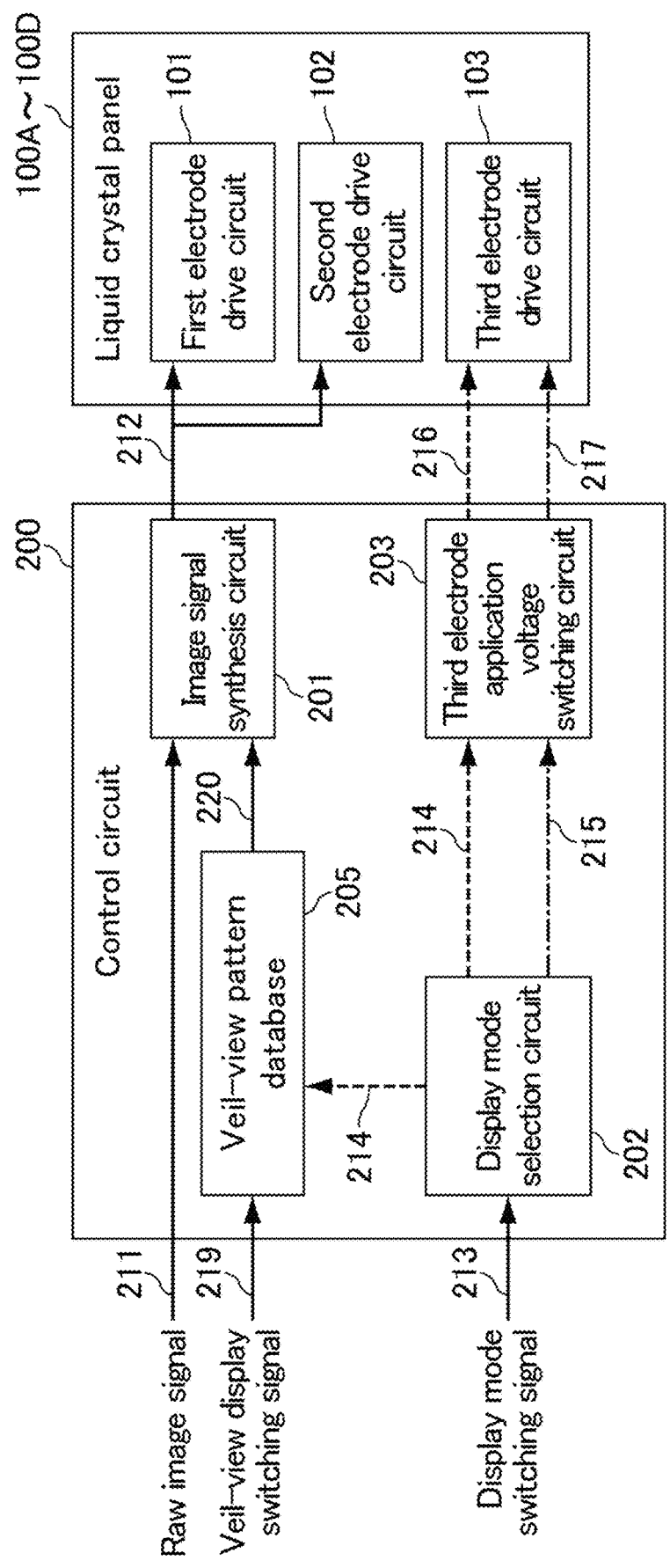
FIG. 16 is a block diagram schematically showing a display method for displaying a veil-view pattern in Embodiment 3.

The switching of the display modes may be combined with the later-described soft veil-view function. The soft veil-view function utilizes software to display a given veil-view pattern. For example, software may drive the control circuit to display a veil-view pattern. The following shows an example of a method of displaying an image by the soft veil-view function with reference to FIG. 14 to FIG. 16. FIG. 14 is a schematic plan view showing an example of a single display unit in the liquid crystal panel. FIG. 15 is a schematic plan view showing an example of a color element for providing color display using a soft veil-view function. FIG. 16 is a block diagram schematically showing a display method for displaying a veil-view pattern in Embodiment 3.

As shown in FIG. 14, the liquid crystal panels 100A to 100D (hereinafter, simply referred to as the liquid crystal panel) include display units 72 which utilize the soft veil-view function to display an image. The display units 72 each include a pair of sub-pixels arranged adjacent to each other, one of the sub-pixels being a first sub-pixel 70 selected from an odd-number row and the other being a second sub-pixel 71 selected from an even-number row. The first pixel 70 and the second pixel 71 may each be considered as one sub-pixel as shown in FIG. 1 and FIG. 6, or a combination of a first red sub-pixel 70R, a first green sub-pixel 70G, and a first blue sub-pixel 70B may be regarded as the first pixel 70 and a combination of a second red sub-pixel 71R, a second green sub-pixel 71G, and a second blue sub-pixel 71B may be regarded as the second pixel 71. For color display by an ordinary display method, the pixels including red, green, and blue pixels are independently driven. In the ordinary color display, the display can be at a resolution twice that of the color display using the soft veil-view function.

For color display, the liquid crystal panel preferably includes a red display unit 72R including a first red sub-pixel 70R and a second red sub-pixel 71R, a green display unit 72G including a first green sub-pixel 70G and a second green sub-pixel 71G, and a blue display unit 72B including a first blue sub-pixel 70B and a second blue sub-pixel 71B. Each color element 73 may include a red display unit 72R, a green display unit 72G, and a blue display unit 72B. The first red sub-pixel 70R and the second red sub-pixel 71R each coincide with a red color filter 32R in an optical opening. The first green sub-pixel 70G and the second green sub-pixel 71G each coincide with a green color filter 32G in an optical opening. The first blue sub-pixel 70B and the second blue sub-pixel 71B each coincide with a blue color filter 32B in an optical opening.

An image can be displayed using the soft veil-view function by, for example, dividing the luminance data value of the raw image desired to be displayed as a first image, Data 1, into two equivalent data values Data 2 and Data 3, inputting the data value of Data 1+Data 2 to the first sub-pixel 70 or the second sub-pixel 71, and inputting the data value of Data 1−Data 3 to the other. When the liquid crystal panel is observed in the narrow viewing angle range, the luminance of the first sub-pixel 70 and the luminance of the second sub-pixel 71 are spatially averaged to be recognized as the luminance of the raw image. Meanwhile, when the panel is observed in the wide viewing angle range outside the narrow viewing angle range, the luminance values are recognized as the luminance Data 1+Data 2 or the luminance Data 1−Data 3.

Hereinafter, the method of displaying a veil-view pattern is described with reference to FIG. 16. The control circuit 200 in the first display mode inputs different image signals to the first sub-pixel and the second sub-pixel such that a second image different from the first image is observed in the wide viewing angle range outside the narrow viewing angle range. Such a display method is also referred to as the soft veil-view function. Display using the soft veil-view function can enhance the privacy when combined with the first display mode (privacy mode). Thus, when receiving a first display mode selection signal 214 from the display mode selection circuit 202, a veil-view pattern database 205 preferably outputs a veil-view pattern image signal 220 to the image signal synthesis circuit 201.

As shown in FIG. 16, the control circuit 200 may further include the database 205 in which information related to the veil-view patterns is stored. When receiving a veil-view display switching signal 219, the database 205 outputs a veil-view pattern image signal 220 to the image signal synthesis circuit 201. The image signal synthesis circuit 201 outputs an image signal 212 formed by synthesis of the raw image signal 211 and the veil-view pattern image signal 220 to the first electrode drive circuit 101 and the second electrode drive circuit 102.

For example, when the second electrode drive circuit 102 applies common voltage to the second electrodes 14, the first electrode drive circuit 101 applies different voltages to the first electrode(s) 12 corresponding to the first sub-pixel 70 and the second sub-pixel 71 such that the second image is observed in the wide viewing angle range outside the narrow viewing angle range. In this case, one first electrode 12 is preferably provided in each sub-pixel. When the first electrode drive circuit 101 applies common voltage to the first electrode 12, the second electrode drive circuit 102 applies different voltages to the second electrodes 14 corresponding to the first sub-pixel 70 and the second sub-pixel 71 such that the second image is observed in the wide viewing angle range outside the narrow viewing angle range.

The second image is preferably a veil-view pattern. The veil-view pattern is a display image that is to be superimposed with the first image to make the first image less perceivable. Displaying the veil-view pattern further enhances the privacy. The veil-view pattern is not limited, and may be a geometric pattern such as a striped pattern or a checkered pattern, characters, or an image.

Embodiment 4

A liquid crystal display device of Embodiment 4 includes a backlight behind the back surface of the liquid crystal panel. The backlight includes light sources, and a shading louver closer to the liquid crystal panel than the light sources are. The control circuit controls the luminance of the backlight to be lower in the first display mode than in the second display mode. The liquid crystal panel may be any one of the liquid crystal panels 100A to 100D described in Embodiments 1 and 2.

In Embodiment 4, the backlight used includes light sources and a shading louver closer to the liquid crystal panel than the light sources are. With such a backlight including a shading louver, the luminance in the normal direction is relatively increased and thus the directive property of the backlight is enhanced. The backlight including a shading louver can be a known one. For example, the backlight disclosed in JP 2002-124112 A may be used.

Figure 17:
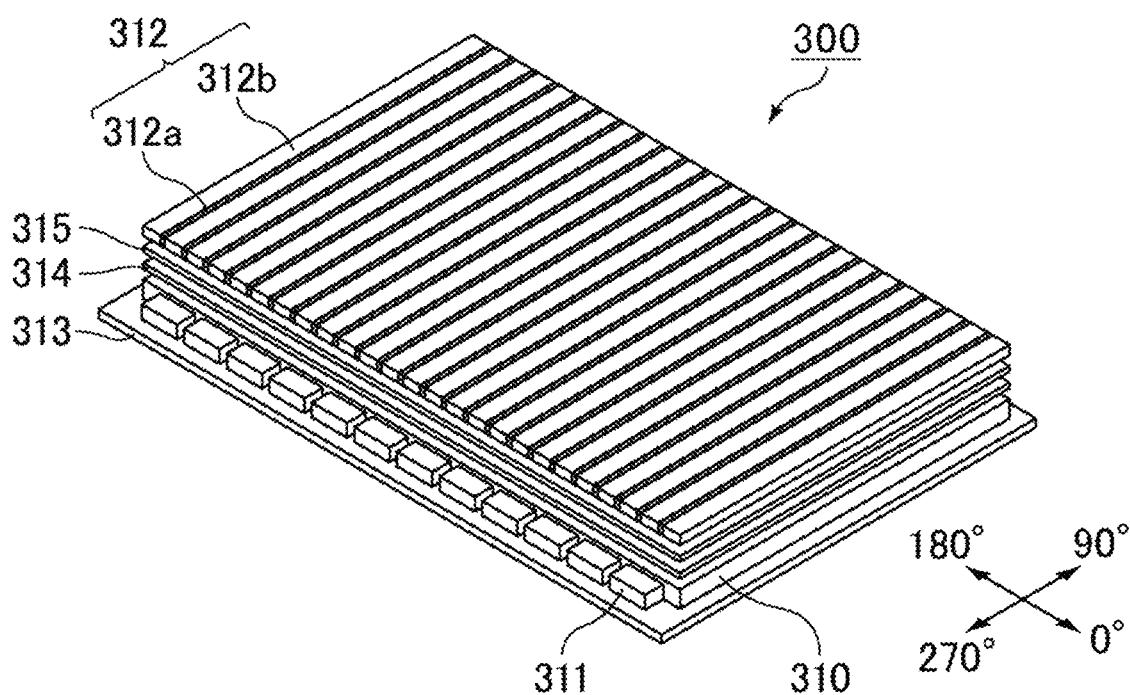
FIG. 17 is an exploded perspective view schematically showing a backlight including a shading louver in Embodiment 4.

FIG. 17 is an exploded perspective view schematically showing a backlight including a shading louver in Embodiment 4. The backlight including a shading louver may be an edge-lit backlight, and may include, for example, as shown in FIG. 17, a light guide plate 310, light sources 311 on a side surface of the light guide plate 310, and a shading louver 312 on or in front of the light guide plate 310 (between the light guide plate 310 and the liquid crystal panel). A reflection sheet 313 may be disposed on the back surface of the light guide plate 310, and components such as a prism sheet 314 and a diffusion sheet 315 may be disposed between the light guide plate 310 and the shading louver 312. The light sources 311 are disposed on at least one of the opposing side surfaces of the light guide plate 310, and may be disposed on both side surfaces. FIG. 17 shows an example in which the light sources 311 are disposed along a 0°-180° azimuth side of the liquid crystal panel, but may be disposed along a 90°-270° azimuth side of the liquid crystal panel.

The shading louver 312 preferably blocks light incident thereon from the light guide plate depending on the angle of incidence. Examples of the shading louver include one disclosed in JP 2002-124112 A alternately including light transmitting layers 312a that transmit light and light absorbing layers 312b that absorb light at certain intervals. The intervals at which the light transmitting layers 312a and the light absorbing layers 312b are disposed may be, for example, 100 μm to 150 μm. The light transmitting layers 312a and the light absorbing layers 312b in a plan view may be disposed linearly. The extending direction of the light transmitting layers 312a and the light absorbing layers 312b preferably form an angle of 0° to 10° with the 90°-270° azimuth of the liquid crystal panel, and may be parallel to (form an angle of 0° with) the 90°-270° azimuth. The light transmitting layers 312a may be formed from a resin transparent to light, for example. The light absorbing layers 312b may be formed from a resin containing a black pigment or dye. The total light transmittance of the light absorbing layers 312b is preferably, for example, 5% or lower. The total light transmittance of the light transmitting layers 312a is preferably 80% or higher.

Figure 18:
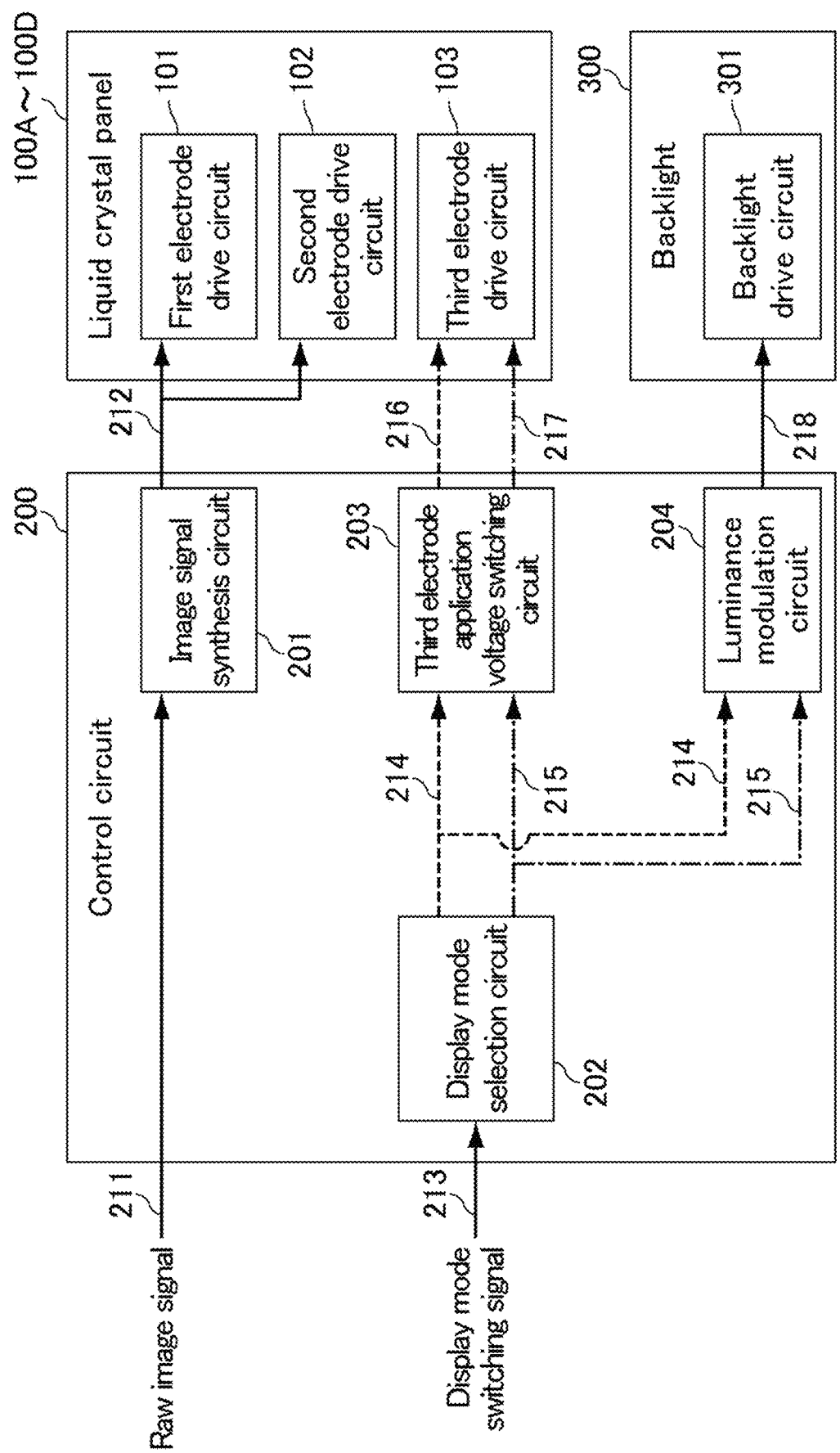
FIG. 18 is a block diagram schematically showing a method for providing display in the first display mode and the second display mode in Embodiment 4.
Figure 19:
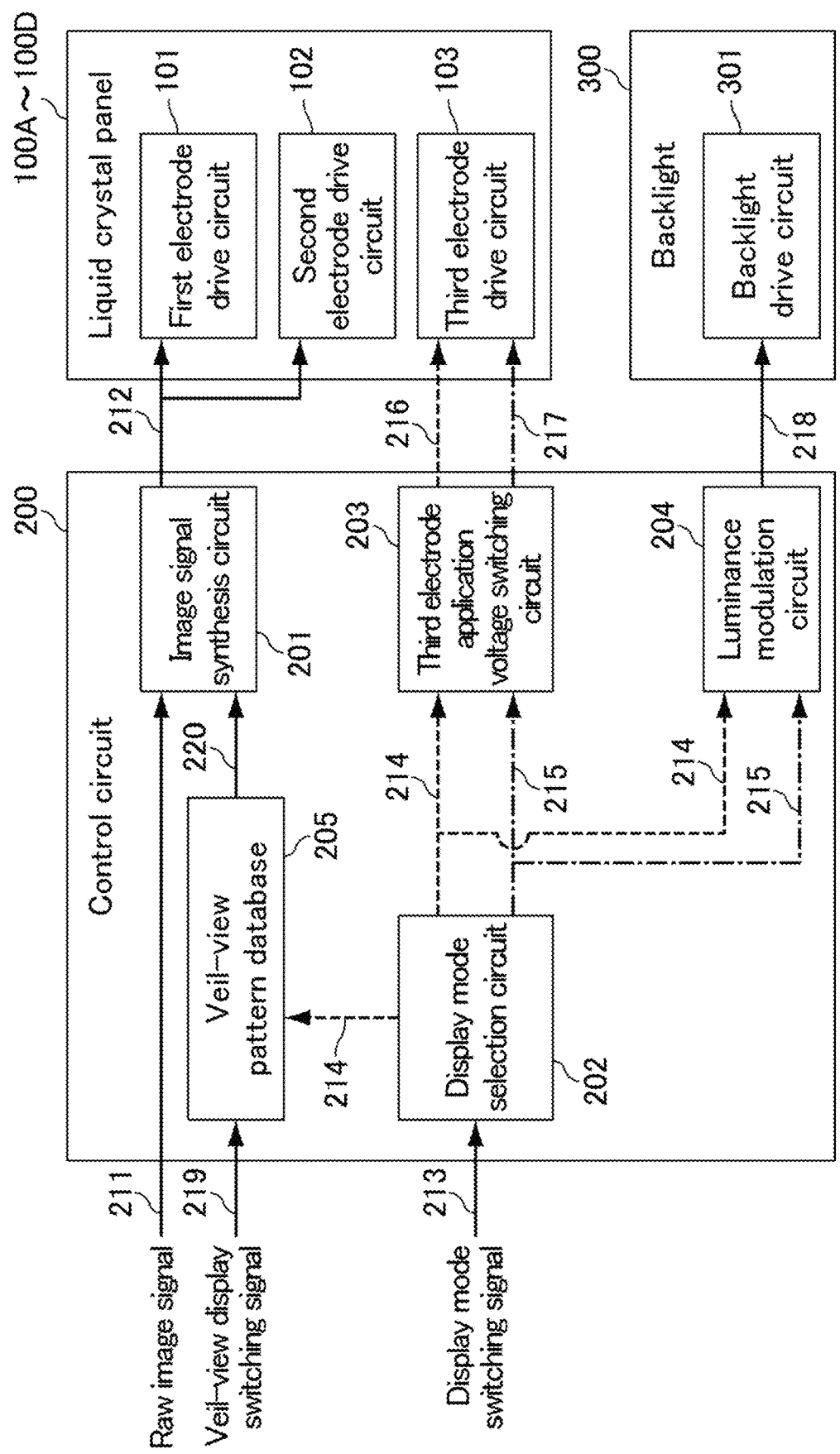
FIG. 19 is a block diagram schematically showing a method for displaying a veil-view pattern in Embodiment 4.

The liquid crystal display device of Embodiment 4 can more effectively enhance the privacy in the privacy mode when the luminance of its backlight is synchronized with the display mode. FIG. 18 is a block diagram schematically showing a method for providing display in the first display mode and the second display mode in Embodiment 4. FIG. 19 is a block diagram schematically showing a method for displaying a veil-view pattern in Embodiment 4.

The control circuit 200 controls the luminance of the backlight 300 to be lower in the first display mode than in the second display mode. As shown in FIG. 18 and FIG. 19, the control circuit 200 may further include a luminance modulation circuit 204 for the backlight. The backlight 300 may include a backlight drive circuit 301.

When receiving a first display mode selection signal 214 from the display mode selection circuit 202, the luminance modulation circuit 204 outputs a luminance modulation signal 218 to the backlight drive circuit 301 to adjust the luminance of the backlight 300 low. When receiving a second display mode selection signal 215 from the display mode selection circuit 202, the luminance modulation circuit 204 outputs a luminance modulation signal 218 to the backlight drive circuit 301 to adjust the luminance of the backlight 300 high.

The luminance of the backlight 300 may be adjusted such that the luminance of the liquid crystal panel in white display in observation from the normal direction is, for example, 100 to 300 nit in the first display mode and 300 to 500 nit in the second display mode.

EXAMPLES

Hereinafter, the effect of the present invention is described with reference to examples and comparative examples. The present invention is not limited to these examples.

Example 1

Example 1 is a specific example of Embodiment 1, and the schematic plan view thereof is the same as FIG. 1. The liquid crystal panel used in Example 1 has the same configuration as the liquid crystal panel 100B including the second dielectric layer 51 shown in drawings such as FIG. 5. The active matrix substrate 10 had an FFS electrode structure. The first electrode 12 was a solid electrode with no opening. The second electrodes 14 were arranged in the respective sub-pixels and each had an electrode structure including three first linear electrodes 14a with a width of 2.5 μm and provided with the openings 14b with a width of 3.5 μm between adjacent first linear electrodes 14a. The liquid crystal molecules were of a positive liquid crystal material. The color filter substrate 30 included a color filter layer with a thickness of 2.3 μm, the first dielectric layer 50 with a thickness of 2 μm, and the second dielectric layer 51 with a thickness of 2 μm. The extension direction (first direction D1) of the first linear electrodes 14a and the extension direction (second direction D2) of the second linear electrodes 34a and the third linear electrodes 34b of the third electrode formed an angle θ1 of 80°. The size of each sub-pixel was 25 μm in width in the second direction and 75 μm in length in a direction perpendicular to the second direction.

The number of third linear electrodes 34b of the third electrode 34 in Example 1 overlapping the optical opening of one sub-pixel was three. The width W34a of each third linear electrode 34b was 5 μm. The distance between a second linear electrode 34a and a third linear electrode 34b and a distance between adjacent third linear electrodes 34b were 5 μm.

In a plan view, the fourth linear electrodes 35a were disposed, each between a second linear electrode 34a and a third linear electrode 34b or between adjacent third linear electrodes 34b. Four fourth linear electrodes 35a were disposed in one sub-pixel. The width W35a of each fourth linear electrode 35a in the fourth electrode was 5 μm. The distance between adjacent fourth linear electrodes 35a was 5 μm. The distance d1 between a fourth linear electrode 35a and an adjacent second linear electrode 34a and the distance d2 between a fourth linear electrode 35a and an adjacent third linear electrode 34b were both 3 μm.

The first electrode 12, the second electrodes 14, the third electrode 34, and the fourth electrode 35 can be made of ITO. For example, the first insulating layer 13 can be made of silicon oxide and the first dielectric layer 50 can be made of an acrylic resin. The black matrix can be one that is made of a black resin and has a resistivity of $1.0 \times 10^{10}$ to $1.0 \times 10^{13}$ (Ω·cm).

Example 2

Example 2 is a specific example of Embodiment 1 and relates to a liquid crystal panel having the same configuration as in Example 1, except that the liquid crystal panel has no second dielectric layer 51. The liquid crystal panel used in Example 2 has the same configuration as the liquid crystal panel 100A shown in drawings such as FIG. 1 and FIG. 4.

Example 3

Example 3 is a specific example of Embodiment 2 and utilizes the fourth electrode including a plurality of island electrodes 35b (e.g., see FIG. 6 and FIG. 11). The liquid crystal panel of Example 3 has the same configuration as in Example 1, except that the fourth electrode includes the island electrodes 35b instead of the linear electrodes and the liquid crystal panel has no second dielectric layer 51. In Example 3, the number of the third linear electrodes 34b overlapping the optical opening of one sub-pixel was three as in Example 1.

In Example 3, four island electrodes 35b in total were disposed, each between a second linear electrode 34a and a third linear electrode 34b or between adjacent third linear electrodes 34b, along each of the two opposing outer edge lines of the black matrix 33 across the optical opening in one sub-pixel.

The width W35b of each of the island electrodes 35b in the fourth electrode was 5 μm. The distance between adjacent island electrodes 35b was 5 μm. The distance d3 between an island electrode 35b and an adjacent second linear electrode 34a and the distance d4 between an island electrode 35b and an adjacent third linear electrode 34b were both 3 μm.

Comparative Example 1

Figure 20:
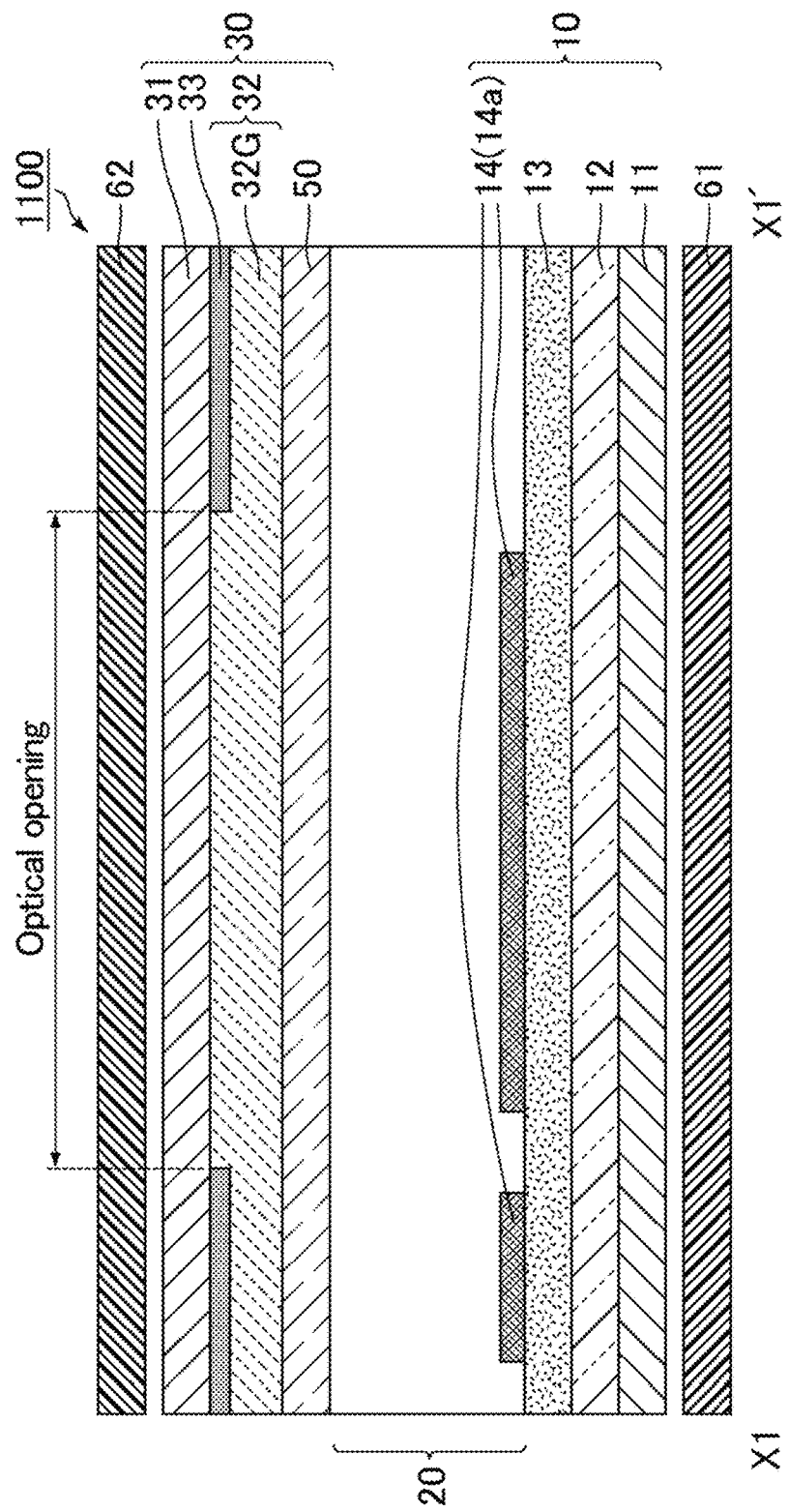
FIG. 20 is a schematic cross-sectional view of a liquid crystal panel of Comparative Example 1.

FIG. 20 is a schematic cross-sectional view of a liquid crystal panel of Comparative Example 1 and corresponds to a schematic cross-sectional view taken along line X1-X1' in FIG. 1. As shown in FIG. 20, a color filter substrate 30 in a liquid crystal panel 1100 of Comparative Example 1 sequentially includes a second substrate 31, a black matrix 33, color filters 32 (32G), and a first dielectric layer 50. The liquid crystal panel 1100 of Comparative Example 1 includes no electrode in the color filter substrate 30. The thickness of the color filter layer was 2.3 μm. The thickness of the first dielectric layer 50 was 2 μm. An active matrix substrate 10 has the same configuration as in Example 1, and has an FFS electrode structure including a stack of the first electrode 12 and the second electrodes 14 with the first insulating layer 13 in between.

<Contrast Ratio Simulation>

The contrast ratios at azimuths of 0° to 360° in Examples 1 to 3 and Comparative Example 1 were simulated. An LCD Master 3D (available from SHINTECH) was used to simulate the contrast ratio of each liquid crystal panel when the panel was observed at azimuths of 0° to 360°. The viewability was considered favorable at an azimuth at which the contrast ratio was high. The contrast ratio (CR) is represented by the following formula (1).

CR=luminance in white display(grayscale value of 255)/luminance in black display(grayscale value of 0)　　　(1)

In Examples 1 to 3, the contrast ratios in white display in the public mode and the privacy mode were simulated while, in Comparative Example 1, the contrast ratios in white display were simulated. The alternating voltage applied to the first electrode and the second electrodes and the driving voltage applied to the third electrode were measured when the constant voltage applied to the third electrode in the public mode was set as the common voltage (0 V).

In the public mode, in Examples 1 to 3, the constant voltage (common voltage) was applied to the third electrode. The constant voltage was a fixed voltage of 0 V. In the privacy mode, the cases were simulated where an alternating voltage of 7.5 V relative to the constant voltage was applied to the third electrode in Example 1 and Example 2, and where an alternating voltage of 5 V relative to the constant voltage was applied to the third electrode in Example 3. Both in the public mode and the privacy mode, white display was provided by applying the common voltage (0 V) to the first electrode 12 and applying an alternating voltage of 6.5 V relative to the constant voltage to the second electrodes 14. The frequency of the third electrode was 120 Hz, while the frequency of the second electrodes 14 was 60 Hz. In Comparative Example 1, white display was provided by applying the common voltage (0 V) to the first electrode 12 and applying an alternating voltage of 6.5 V to the second electrode 14.

Figure 21:
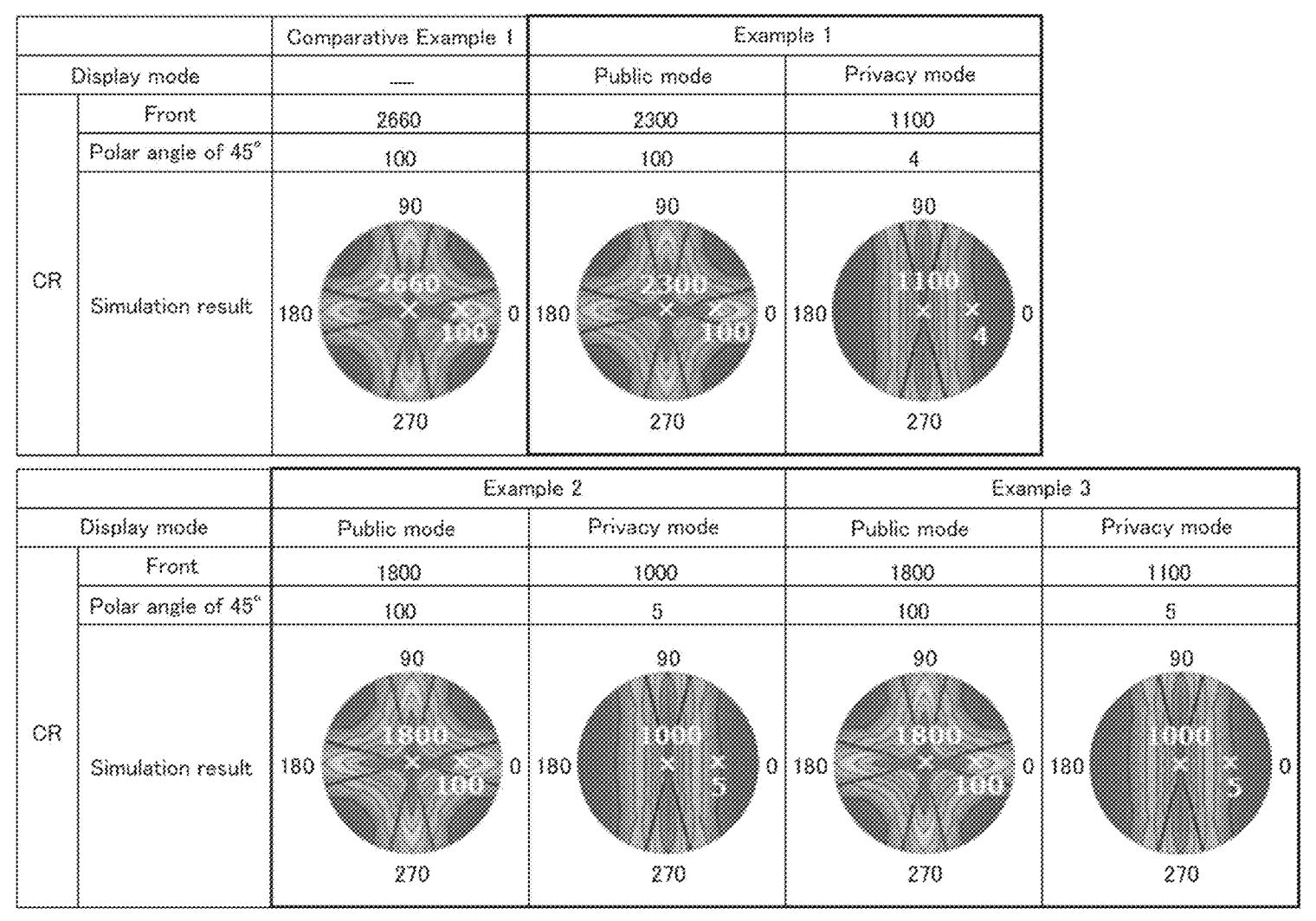

FIG. 21 is a table summarizing the simulation results of the contrast ratios in Examples 1 to 3 and Comparative Example 1. In the table, the "front" for the contrast ratio (CR) represents a front contrast ratio which was measured when the liquid crystal panel was observed from the front (normal direction). The "polar angle of 45°" represents a contrast ratio measured when the liquid crystal panel was observed from an azimuth of 0° or 180° at a polar angle of 45°.

As shown in FIG. 21, in each of Example 1 and Example 2 in which the floating electrode (fourth electrode) includes linear electrodes and Example 3 in which the floating electrode (fourth electrode) includes island electrodes, the public mode and the privacy mode were successfully switched and, in the privacy mode, an increase in the contrast ratio in the horizontal direction at a polar angle of 45° (hereinafter, contrast ratio at a polar angle of 45°) was sufficiently reduced or prevented while a high front contrast ratio was achieved. Also, in Example 1 in which the second dielectric layer 51 was used and Example 2 in which no second dielectric layer 51 was used, the modes were switched at equal levels and, in the privacy mode, an increase in the contrast ratio at a polar angle of 45° was sufficiently reduced or prevented while a high front contrast ratio was achieved. In contrast, in Comparative Example 1 in which no electrode was used in the color filter substrate, the contrast ratio in the horizontal direction was not reduced and the privacy mode was not achieved.

Figure 22:
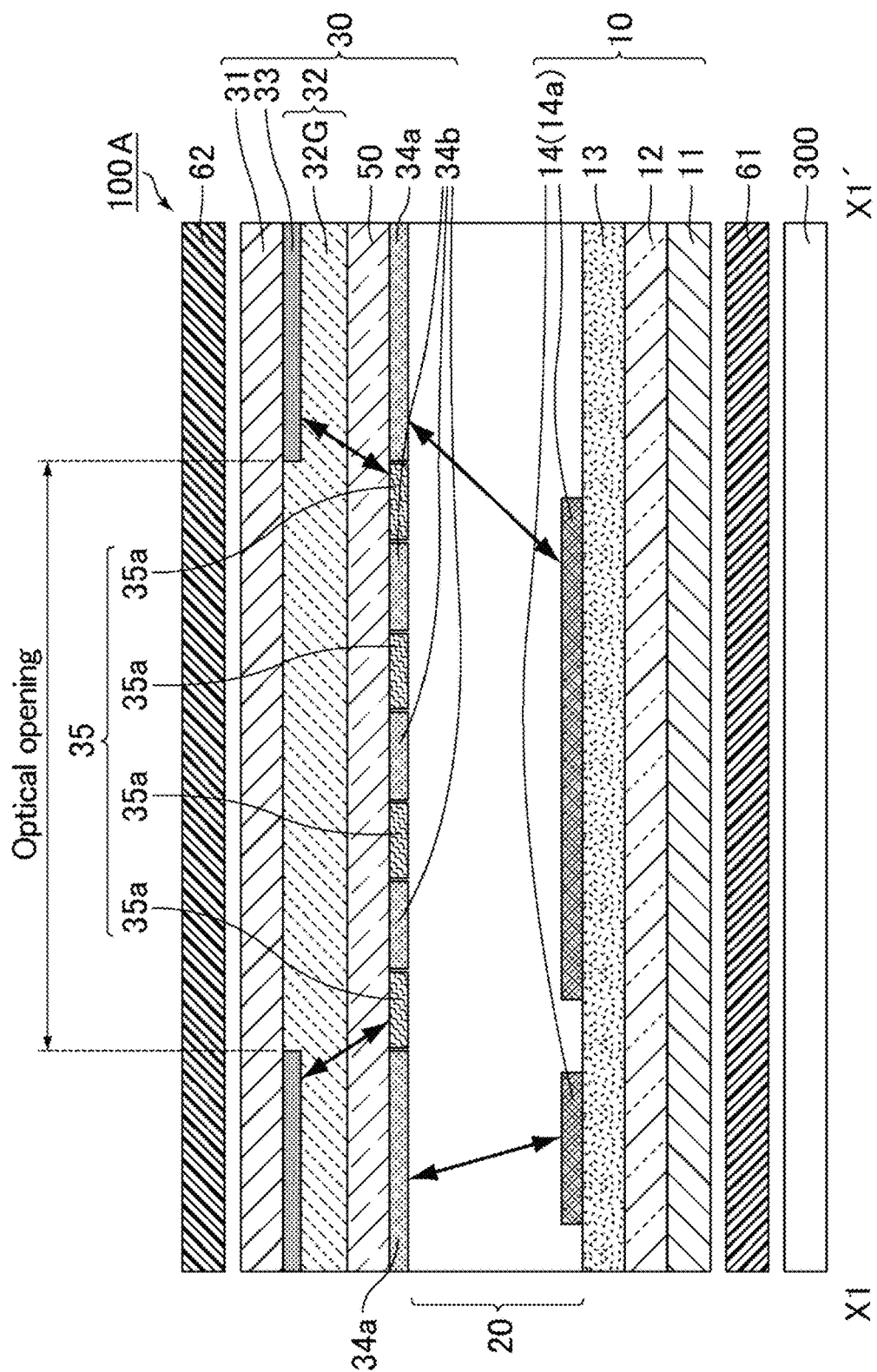
FIG. 22 is a schematic cross-sectional view of electric fields in a liquid crystal panel of Example 1.

FIG. 22 is a schematic cross-sectional view of electric fields in a liquid crystal panel of Example 1. Application of voltage to the third electrode is considered to charge the black matrix. As shown in FIG. 22, with the fourth electrode which is floating in the color filter substrate 30, the flow of the electric fields from the third electrode 34 toward the black matrix 33 can be blocked or the intensity of the electric fields can be reduced. This presumably reduces or prevents generation of electric fields shifted from the absorption axes of the polarizing plates between the black matrix 33 and the electrodes in the active matrix substrate 10. Also in Examples 2 and 3, generation of the electric fields due to the charging of the black matrix can be reduced or prevented. As a result, the liquid crystal display devices of Examples 1 to 3 can prevent occurrence of light leakage.

<Measurement of Luminance in Privacy Mode and Public Mode>

In Comparative Example 1, Example 2, and Example 3, the luminance values in black display (grayscale of 0) and white display (grayscale value of 255) when the display screen was observed from the normal direction (front) were measured. The "SR-UL1R" available from Topcon Technohouse Corporation was used to measure the luminance values. The following Table 1 shows the results. In the following Table 1, the luminance values in white display in Example 2 and Example 3 are those obtained with the luminance in white display in Comparative Example 1 taken as 100%, and the luminance values in black display in Example 2 and Example 3 are those obtained with the luminance in black display in Comparative Example 1 taken as 100%.

TABLE 1

| Display mode | | Comparative Example 1 | Example 2 | | Example 3 | |
|---|---|---|---|---|---|---|
| | | — | Public mode | Privacy mode | Public mode | Privacy mode |
| Luminance (front) | White display (%) | 100 | 70 | 70 | 75 | 75 |
| | Black display (%) | 100 | 100 | 200 | 100 | 200 |

The results in Table 1 show that the transmittance in white display can be made higher in Example 3 in which the floating electrode (fourth electrode) included island electrodes than in Example 2 in which the floating electrode (fourth electrode) included linear electrodes.

Example 4

Example 4 is a specific example of Embodiment 2 and the blacklight includes a shading louver. The liquid crystal panel of Example 4 had the same configuration as the liquid crystal panel of Example 3, except that the number of the third linear electrodes 34b of the third electrode and the number of the island electrodes 35b of the fourth electrode were varied, with the width W35b of each island electrode 35b changed to 5.3 μm.

The number of the third linear electrodes 34b of the third electrode 34 overlapping the opening of one sub-pixel was two in Example 4. The width W34a of each third linear electrode 34b was 5 μm. The distance between a second linear electrode 34a and a third linear electrode 34b and the distance between adjacent third linear electrodes 34b were 11.3 μm.

In Example 4, three island electrodes 35b in total were disposed, each between a second linear electrode 34a and a third linear electrode 34b or between adjacent third linear electrodes 34b, along each of the two opposing outer edge lines of the black matrix 33 across the optical opening in one sub-pixel.

The width W35b of each of the island electrodes 35b of the fourth electrode was 5 μm. The distance between adjacent island electrodes 35b was 11 μm. The distance d3 between an island electrode 35b and an adjacent second linear electrode 34a and the distance d4 between an island electrode 35b and an adjacent third linear electrode 34b were both 3 μm.

In the public mode, the case was simulated where the constant voltage (common voltage) was applied to the third electrode. In the privacy mode, the case was simulated where an alternating voltage of 3 V (120 Hz) relative to the constant voltage was applied as the driving voltage to the third electrode. The constant voltage was a fixed voltage of 0 V. Both in the public mode and the privacy mode, white display was provided by applying the common voltage (0 V) to the first electrode 12 and an alternating voltage of 5 V (60 Hz) relative to the constant voltage to the second electrodes 14.

In Example 4, the luminance of the backlight was controlled to be lower in the first display mode (privacy mode) than in the second display mode (public mode). In the public mode, the luminance of the backlight was adjusted such that the luminance of the liquid crystal panel in the normal direction (polar angle of 0°) was 500 nit. The luminance at a polar angle of ±45° in the public mode was 15 nit. In the privacy mode, the luminance of the backlight was adjusted such that the luminance of the liquid crystal panel at a polar angle of 0° was 100 nit. The luminance at a polar angle of ±45° in the privacy mode was 3 nit. The luminance at +45° was measured when the liquid crystal panel was observed from an azimuth of 0° at a polar angle of 45°. The luminance at −45° was measured when the liquid crystal panel was observed from an azimuth of 180° at a polar angle of 45°.

Figure 23:
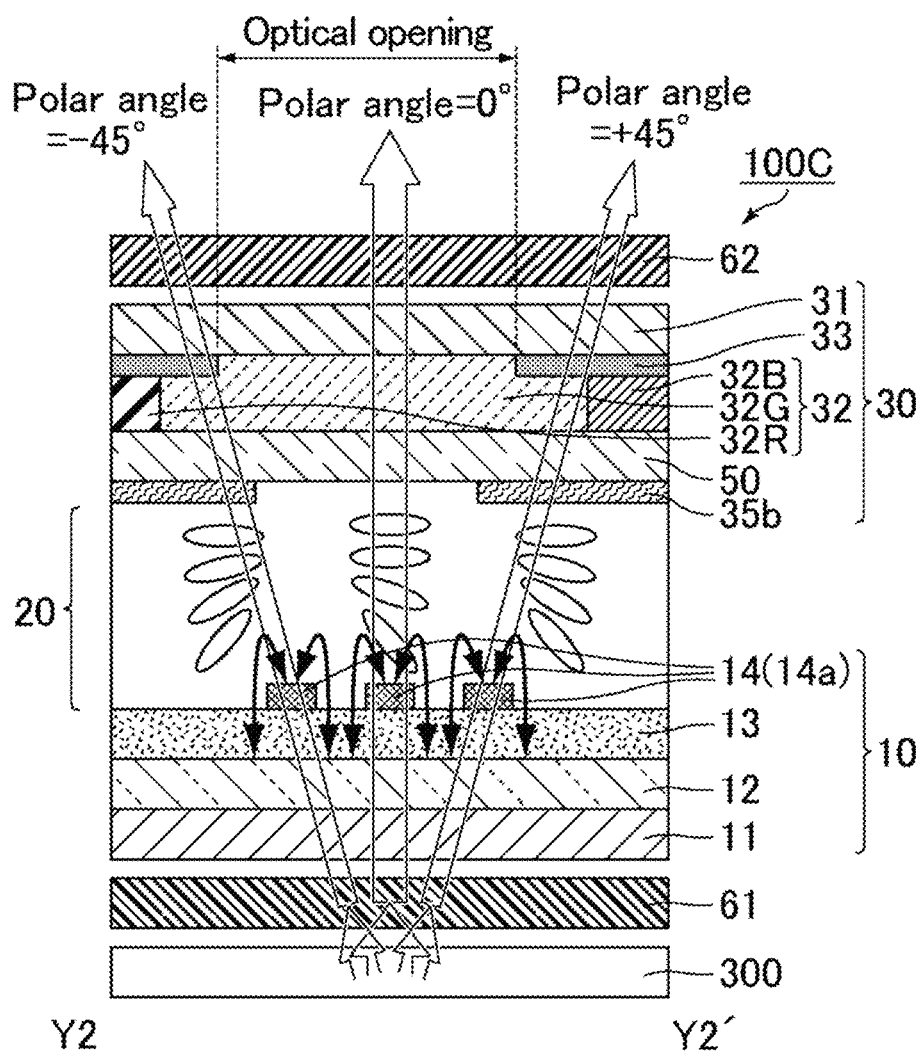
FIG. 23 is a schematic cross-sectional view showing a case of providing display in the public mode using the backlight in Example 4.
Figure 24:
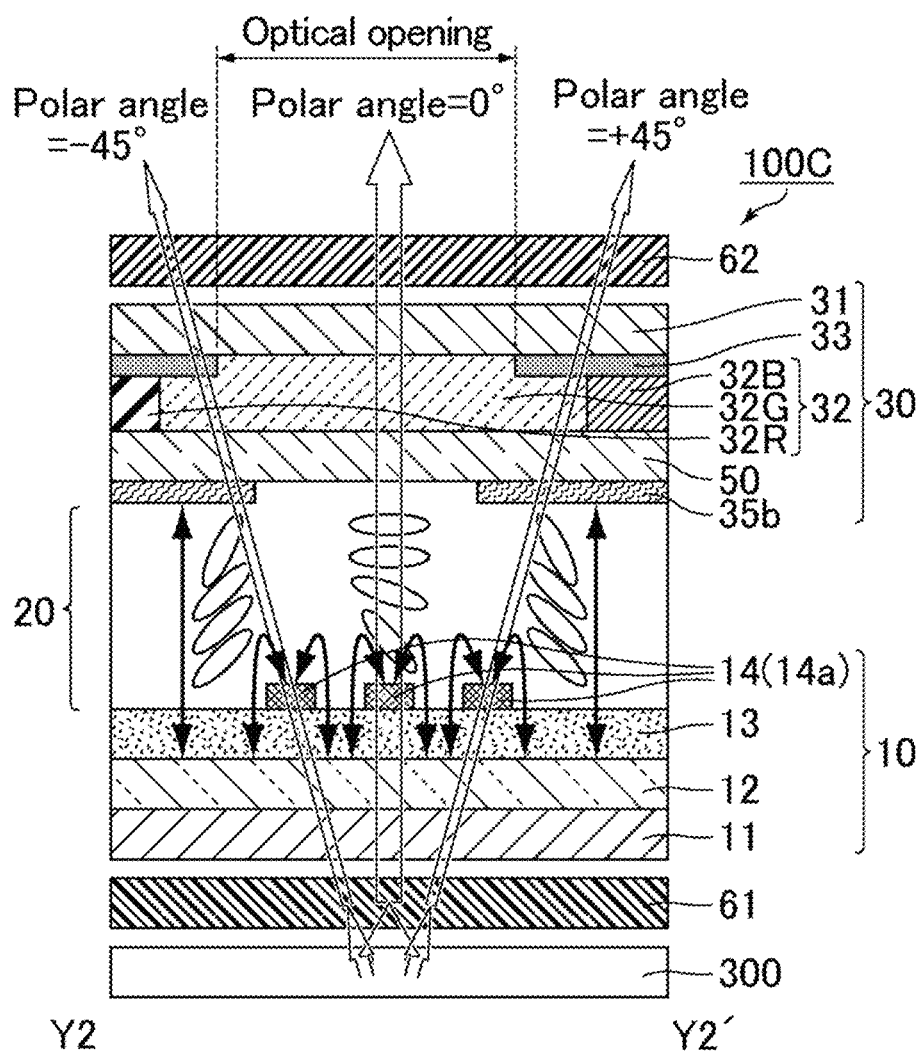
FIG. 24 is a schematic cross-sectional view showing a case of providing display in the privacy mode using the backlight in Example 4.
Figure 25:
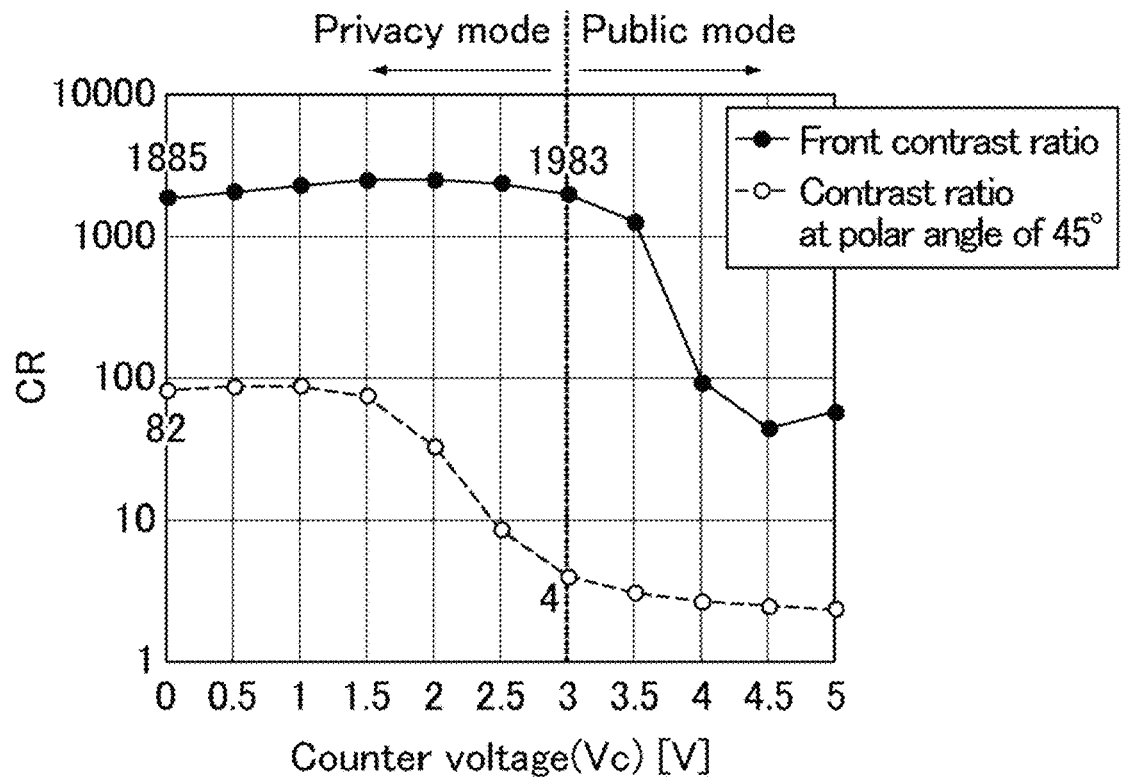
FIG. 25 is a graph of contrast ratios at the front and a polar angle of 45° in Example 4.

FIG. 23 is a schematic cross-sectional view showing a case of providing display in the public mode using the backlight in Example 4. FIG. 24 is a schematic cross-sectional view showing a case of providing display in the privacy mode using the backlight in Example 4. FIG. 25 is a graph of contrast ratios at the front and a polar angle of 45° in Example 4. In FIG. 23 to FIG. 25, the counter voltage (Vc) on the horizontal axis is the voltage applied to the third electrode.

With the backlight including a shading louver, as shown in FIG. 23 and FIG. 24, the luminance in the normal direction (polar angle of 0°) is higher than the luminance at a polar angle of ±45°. As described above, controlling the luminance of the backlight to be lower in the privacy mode than in the public mode enables enhancement of the privacy while maintaining a favorable front viewability.

As shown in FIG. 25, applying the constant voltage (0 V) to the third electrode switched the mode to the public mode where the front contrast ratio was 1885 and the contrast ratio at a polar angle of 45° was 82. In contrast, applying a driving voltage to the third electrode switched the mode to the privacy mode where the front contrast ratio was 1983 and the contrast ratio at a polar angle of 45° was 4.

Figure 26:
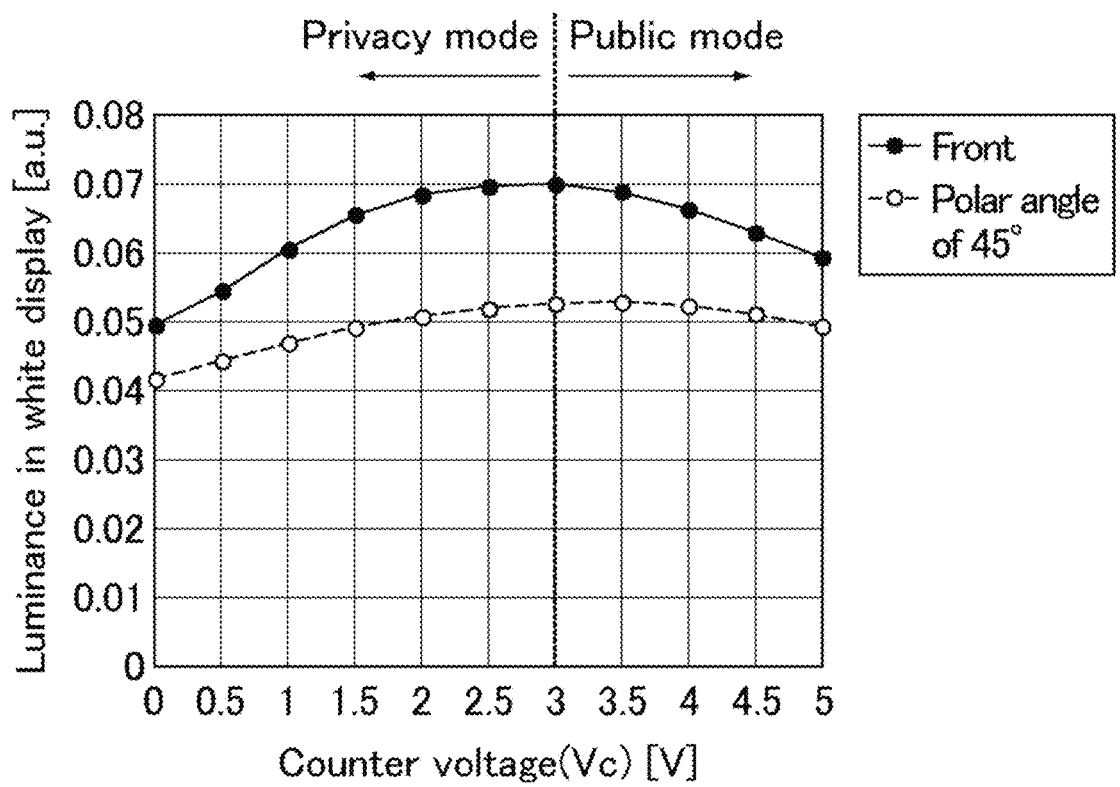
FIG. 26 is a graph of luminance values at the front and a polar angle of 45° in white display in Example 4.
Figure 27:
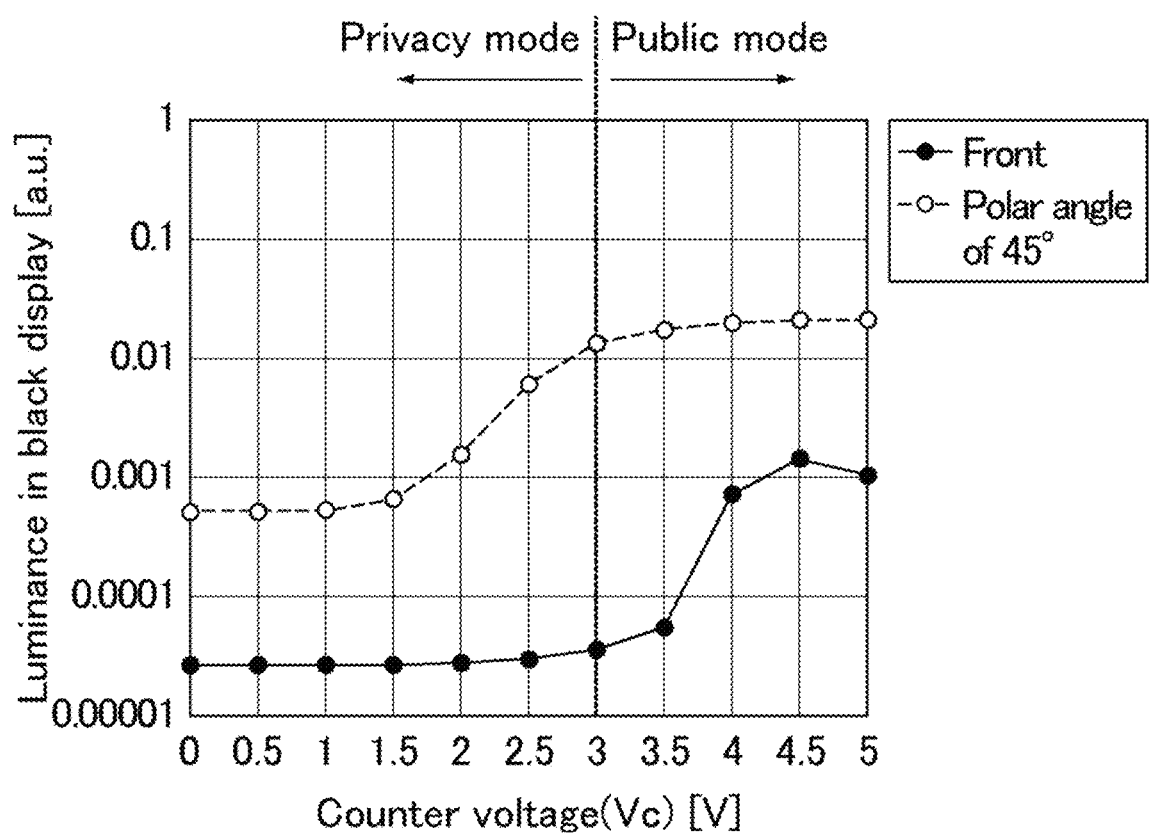
FIG. 27 is a graph of luminance values at the front and a polar angle of 45° in black display in Example 4.

FIG. 26 is a graph of luminance values at the front and a polar angle of 45° in white display in Example 4. FIG. 27 is a graph of luminance values at the front and a polar angle of 45° in black display in Example 4. Examination of the luminance of the liquid crystal display device in white display with reference to FIG. 26 found that the luminance in observation from the front was about 1.4 times the luminance at a polar angle of 45°. In contrast, examination of the luminance of the liquid crystal display device in black display with reference to FIG. 27 found that the luminance in observation from the front was about 100 times the luminance at a polar angle of 45°. As shown in FIG. 27, with the floating electrode, only the luminance in black display at a polar angle of 45° was successfully increased while an increase in luminance in black display in observation from the front was reduced or prevented, even when the counter voltage was increased. In addition, when the luminance of the backlight including a shading louver was adjusted, as shown in FIG. 25, the contrast ratio in observation from an oblique direction was reduced while a front contrast ratio of 1000 or higher was maintained, so that the privacy in the privacy mode was enhanced.

REFERENCE SIGNS LIST

1: gate line
2: source line
3: TFT
10: active matrix substrate
11: first substrate
12: first electrode
13: first insulating layer
14: second electrode
14a: first linear electrode
14b: opening
20: liquid crystal layer
30: color filter substrate
31: second substrate
32: color filter
32B: blue color filter
32G: green color filter
32R: red color filter
33: black matrix
34: third electrode
34a: second linear electrode
34b: third linear electrode
35: fourth electrode (floating electrode)
35a: fourth linear electrode
35b: island electrode
50: first dielectric layer
51: second dielectric layer
61: first polarizing plate
61A: absorption axis of first polarizing plate
62: second polarizing plate
62A: absorption axis of second polarizing plate
70: sub-pixel (first sub-pixel)
70B: first blue sub-pixel
70G: first green sub-pixel
70R: first red sub-pixel
71: second sub-pixel
71B: second blue sub-pixel
71G: second green sub-pixel
71R: second red sub-pixel
72: display unit
72B: blue display unit 72G: green display unit
72R: red display unit
73: color element
100A, 100B, 100C, 100D, 1100: liquid crystal panel
101: first electrode drive circuit
102: second electrode drive circuit
103: third electrode drive circuit
200: control circuit
201: image signal synthesis circuit
202: display mode selection circuit
203: third electrode application voltage switching circuit
204: luminance modulation circuit
205: veil-view pattern database
211: raw image signal
212: image signal
213: display mode switching signal
214: first display mode selection signal
215: second display mode selection signal
216: driving voltage signal
217: constant voltage signal
218: luminance modulation signal
219: veil-view display switching signal
220: veil-view pattern image signal
300: backlight
301: backlight drive circuit
310: light guide plate
311: light source
312: shading louver
312a: light transmitting layer
312b: light absorbing layer
313: reflection sheet
314: prism sheet
315: diffusion sheet

What is claimed is:

1. A liquid crystal display device comprising:
a liquid crystal panel provided with sub-pixels arranged in a matrix pattern; and
a control circuit,
the liquid crystal panel sequentially including an active matrix substrate, a liquid crystal layer, and a color filter substrate,
the active matrix substrate sequentially including a first substrate, a first electrode, a first insulating layer, and second electrodes arranged in the respective sub-pixels and including a first linear electrode extending in a first direction,
the color filter substrate including a second substrate, a black matrix lying between the sub-pixels, a color filter layer, a third electrode including second linear electrodes, and a fourth electrode which is a floating electrode,
the third electrode and the fourth electrode disposed between the black matrix and the liquid crystal layer,
the second linear electrodes extending in a second direction that intersects the first direction and each overlapping a portion of the black matrix extending in the second direction,
the fourth electrode disposed in the same layer as the third electrode and between the second linear electrodes and overlapping at least a portion of the black matrix in a plan view, and
the control circuit configured to switch between an application of a driving voltage and an application of a constant voltage to the third electrode.

2. The liquid crystal display device according to claim 1, further comprising:
a dielectric layer between the third electrode and the liquid crystal layer.

3. The liquid crystal display device according to claim 1, wherein the third electrode is formed from a transparent conductive material.

4. The liquid crystal display device according to claim 1, wherein the active matrix substrate further includes a gate line and a source line intersecting the gate line, and
the gate line extends in the second direction.

5. The liquid crystal display device according to claim 4, wherein at least part of each of the second linear electrodes overlaps the gate line in the plan view.

6. The liquid crystal display device according to claim 1, wherein the control circuit is capable of switching between a first display mode and a second display mode, the first display mode allowing a first image to be observed in a narrow viewing angle range including a direction normal to the liquid crystal panel, the second display mode allowing the first image to be observed in a wide viewing angle range including the narrow viewing angle range, and
the control circuit is further configured to apply the driving voltage to the third electrode in the first display mode and apply the constant voltage to the third electrode in the second display mode.

7. The liquid crystal display device according to claim 6, further comprising:
a backlight behind a back surface of the liquid crystal panel, wherein
the backlight includes a light source and a shading louver disposed closer to the liquid crystal panel than the light source is, and
the control circuit is further configured to control luminance of the backlight to be lower in the first display mode than in the second display mode.

8. A liquid crystal display device comprising:
a liquid crystal panel provided with sub-pixels arranged in a matrix pattern; and
a control circuit,
wherein the liquid crystal panel sequentially includes an active matrix substrate, a liquid crystal layer, and a color filter substrate,
the active matrix substrate sequentially includes a first substrate, a first electrode, a first insulating layer, and second electrodes arranged in the respective sub-pixels and including a first linear electrode extending in a first direction,
the color filter substrate includes a second substrate, a black matrix lying between the sub-pixels, a color filter layer, a third electrode including second linear electrodes and a third linear electrode between the second linear electrodes, and a fourth electrode which is a floating electrode,
the third electrode and the fourth electrode are disposed between the black matrix and the liquid crystal layer,
the second linear electrodes extend in a second direction that intersects the first direction and each overlaps a portion of the black matrix extending in the second direction,
the fourth electrode is disposed in the same layer as the third electrode and between the second linear electrodes and overlaps at least a portion of the black matrix in a plan view,
the control circuit is configured to switch between an application of a driving voltage and an application of a constant voltage to the third electrode, and the third linear electrode extends in the second direction and overlaps an optical opening in one of the sub-pixels in the plan view.

9. The liquid crystal display device according to claim 8, wherein the fourth electrode includes a fourth linear electrode extending in the second direction and overlapping the optical opening in the one of the sub-pixels, and the fourth linear electrode is disposed between one of the second linear electrodes and the third linear electrode.

10. The liquid crystal display device according to claim 8, wherein the fourth electrode includes island electrodes independent of one another in the plan view, and each of the island electrodes is disposed between one of the second linear electrodes and the third linear electrode.

11. A liquid crystal display device comprising:

a liquid crystal panel provided with sub-pixels arranged in a matrix pattern; and a control circuit, wherein the liquid crystal panel sequentially includes an active matrix substrate, a liquid crystal layer, and a color filter substrate, the active matrix substrate sequentially includes a first substrate, a first electrode, a first insulating layer, and second electrodes arranged in the respective sub-pixels and including a first linear electrode extending in a first direction, the color filter substrate includes a second substrate, a black matrix lying between the sub-pixels, a color filter layer, a third electrode including second linear electrodes, and a fourth electrode which is a floating electrode, the third electrode and the fourth electrode are disposed between the black matrix and the liquid crystal layer, the second linear electrodes extend in a second direction that intersects the first direction and each overlaps a portion of the black matrix extending in the second direction, the fourth electrode is disposed between the second linear electrodes and overlaps at least a portion of the black matrix in a plan view, the control circuit is configured to switch between a first display mode and a second display mode and switch between an application of a driving voltage to the third electrode in the first display mode and an application of a constant voltage to the third electrode in the second display mode, the first display mode allowing a first image to be observed in a narrow viewing angle range including a direction normal to the liquid crystal panel, the second display mode allowing the first image to be observed in a wide viewing angle range including the narrow viewing angle range, and in the first display mode, the control circuit is further configured to control the driving voltage applied to the third electrode to be at a frequency that is twice a frequency of a driving voltage applied to the second electrodes.

* * * * *